(12) United States Patent
Yajima et al.

(10) Patent No.: US 7,447,277 B2
(45) Date of Patent: Nov. 4, 2008

(54) OFDM DEMODULATION DEVICE

(75) Inventors: Atsushi Yajima, Tokyo (JP); Kazuhisa Funamoto, Tokyo (JP); Yasunari Ikeda, Kanagawa (JP)

(73) Assignee: Sony Corporation (JP)

( * ) Notice: Subject to any disclaimer, the term of this patent is extended or adjusted under 35 U.S.C. 154(b) by 637 days.

(21) Appl. No.: 10/504,341

(22) PCT Filed: Dec. 18, 2003

(86) PCT No.: PCT/JP03/16261

§ 371 (c)(1),
(2), (4) Date: Jan. 10, 2005

(87) PCT Pub. No.: WO2004/062150

PCT Pub. Date: Jul. 22, 2004

(65) Prior Publication Data
US 2005/0117667 A1    Jun. 2, 2005

(30) Foreign Application Priority Data
Dec. 27, 2002 (JP) .............................. 2002-382213

(51) Int. Cl.
*H04L 27/00* (2006.01)
*H04L 27/10* (2006.01)
*H03K 7/06* (2006.01)

(52) U.S. Cl. ...................... 375/326; 375/295; 375/303; 375/304; 375/344; 375/272

(58) Field of Classification Search ................. 375/295, 375/303, 304, 327, 324, 326, 269, 272, 344, 375/362, 334, 335, 340; 370/208, 442, 478, 370/436, 516–521, 526; 455/702, 701, 75, 455/77, 78, 61, 118, 119, 120, 313
See application file for complete search history.

(56) References Cited

U.S. PATENT DOCUMENTS 6,246,717 B1 * 6/2001 Chen et al. .................. 375/226
6,735,255 B1 * 5/2004 Smart et al. ................. 375/260
2003/0117943 A1 * 6/2003 Sakata et al. ................ 370/210

* cited by examiner

*Primary Examiner*—David C. Payne
*Assistant Examiner*—Linda Wong
(74) *Attorney, Agent, or Firm*—Lerner, David, Littenberg, Krumholz & Mentlik, LLP

(57) ABSTRACT

An OFDM receiver (1) is provided which includes a clock-frequency error calculation circuit (41) to calculate a difference in clock frequency between a clock for a received signal and an operation clock used in the receiver (1), and a guard correlation/peak detection circuit (12) to determine an autocorrelation of a guard interval and detect a peak timing of the correlation signal. The guard correlation/peak detection circuit (12) incorporates a free-running counter, and outputs a count of the free-running counter at the peak timing to the clock-frequency error calculation circuit (41). The clock-frequency error calculation circuit (41) uses a plurality of time-change rate detection circuits provided at different time intervals to calculate a time-change rate of an input count. The clock-frequency error calculation circuit (41) plots the time-change rates to generate a histogram and calculates a clock-frequency error from the histogram.

29 Claims, 19 Drawing Sheets

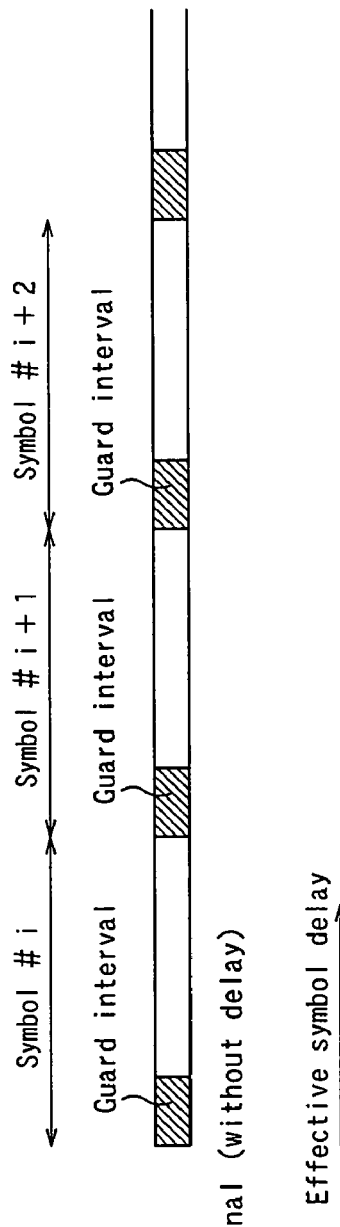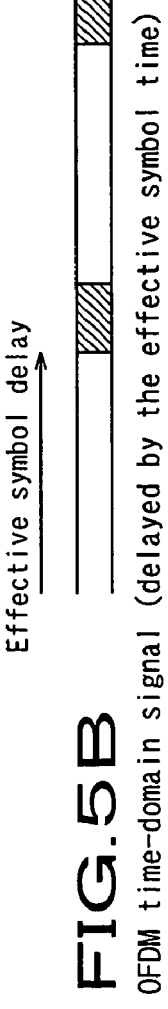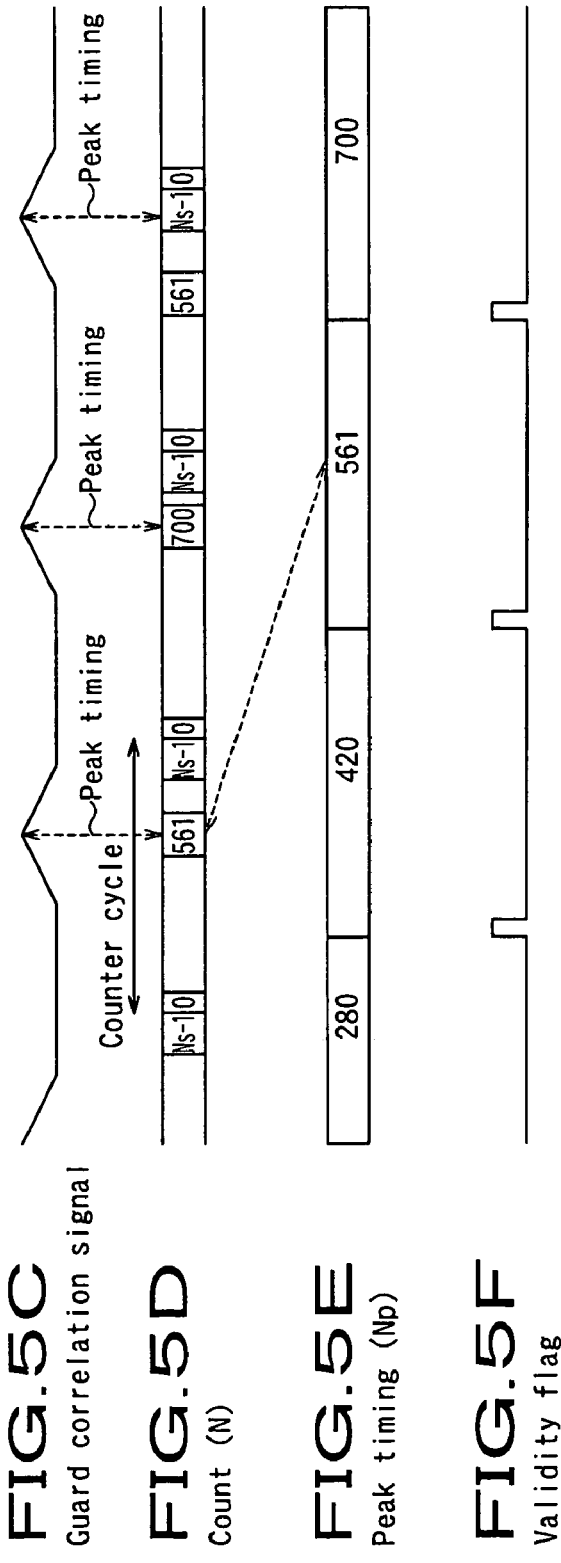

US 7,447,277 B2

OFDM DEMODULATION DEVICE

TECHNICAL FIELD

The present invention relates to a demodulator destined for demodulation of an OFDM (orthogonal frequency division multiplex) modulated signal.

This application claims the priority of the Japanese Patent Application No. 2002-382213 filed on Dec. 27, 2002, the entirety of which is incorporated by reference herein.

BACKGROUND ART

For transmission of digital signals, there is available a modulation technique called "OFDM" (orthogonal frequency division multiplex). The OFDM technique is such that data is digitally modulated for transmission by dividing a transmission frequency band into many orthogonal sub-carriers and assigning the data to the amplitude and phase of each of the sub-carriers by the phase shift keying (PSK) and quadrature amplitude modulation (QAM).

The OFDM technique is characterized in that since a transmission frequency band is divided into many sub-carriers, so the band per sub-carrier is narrower and the modulation rate is lower, while the transmission rate is not totally so different from that in the conventional modulation technique. The OFDM technique is also characterized in that since many sub-carriers are transmitted in parallel, so the symbol rate is lower and the time length of a multipath in relation to that of a symbol can be reduced so that the OFDM technique will not easily be affected by the multipath fading.

Also, the OFDM technique is characterized in that since data is assigned to a plurality of sub-carriers, so a transmission/reception circuit can be formed from an inverse fast Fourier transform (IFFT) calculation circuit in order to modulate the data, while it can be formed from a fast Fourier transform (FFT) calculation circuit in order to demodulate the modulated data.

Because of the above-mentioned characteristics, the OFDM technique is frequently applied to the digital terrestrial broadcasting which is critically affected by the multipath fading. To the digital terrestrial broadcasting adopting the OFDM technique, there is applied the Digital Video Broadcasting-Terrestrial (DVB-T) standard, Integrated Services Digital Broadcasting-Terrestrial (ISDB-T) standard or the like, for example.

As shown in FIG. 1, the transmission symbol used in the OFDM technique (will be referred to as "OFDM symbol" hereunder) is formed from an effective symbol as a signal duration for which IFFT is effected for transmission of data, and a guard interval as a copy of the waveform of an end portion of the effective symbol. The guard interval is provided in the leading portion of the OFDM symbol. Owing to such a guard interval, the OFDM technique allows a multipath-caused inter-symbol fading and improves the multipath resistance.

In the mode 3 of the ISDB-$T_{SB}$ standard (broadcasting standard for the digital terrestrial broadcasting, adopted in Japan), the effective symbol includes 512 sub-carriers spaced 125/126 kHz (≈0.992 kHz) from one to a next one. Also in the mode 3 of the ISDB-TSB standard, transmission data is modulated to 433 of the 512 sub-carriers in the effective symbol. Further in the mode 3 of the ISDB-$T_{SB}$ standard, the length of time of the guard interval is ¼, ⅛, 1/16 or 1/32 of that of the effective symbol.

For the OFDM technique, there is defined a unit of transmission called "OFDM transmission frame" normally composed of a plurality of OFDM symbols. Also, for the OFDM technique, there are defined positions in which a pilot signal of a predetermined phase and amplitude (called "continual pilot (CP)" or "scattered pilot (SP)"), transmission and multiplex configuration control (TMCC) information and transmission parameter signaling (TPS) information are to be inserted. With the OFDM technique, it is possible to control a variety of control, demodulation and decoding at the receiver side by transmitting such a pilot signal (CP or SP), transmission control information (TMCC or TPS) and the like.

According to the ISDB-TSB standard, one OFDM transmission frame is formed from 2040 OFDM symbols.

A conventional OFDM receiver will be illustrated and described.

FIG. 2 schematically illustrates the conventional OFDM receiver in the form of a block diagram.

As shown in FIG. 2, the conventional OFDM receiver, generally indicated with a reference 100, includes an antenna 101, tuner 102, band-pass filter (BPF) 103, A-D conversion circuit 104, DC canceling circuit 105, digital orthogonal demodulation circuit 106, FFT calculation circuit 107, frame extraction circuit 108, synchronization circuit 109, carrier demodulation circuit 110, frequency deinterleaving circuit 111, time deinterleaving circuit 112, demapping circuit 113, bit deinterleaving circuit 114, depuncture circuit 115, Viterbi circuit 116, byte deinterleaving circuit 117, spread-signal canceling circuit 118, transport stream generation circuit 119, RS decoding circuit 120, transmission-control information decoding circuit 121, and a channel selection circuit 122.

A transmission wave sent from a broadcast station is received by the antenna 101 of the OFDM receiver 100 and supplied as an RF signal to the tuner 102.

The RF signal received by the antenna 101 is converted in frequency by the tuner 102 composed of a multiplier 102a and local oscillator 102b into an IF signal, and the IF signal is supplied to the BPF 103. The oscillation frequency of a reception carrier signal generated by the local oscillator 102b is changed correspondingly to a channel select frequency supplied from the channel selection circuit 122.

The IF signal from the tuner 102 is filtered by the BPF 103, and then digitized by the A-D conversion circuit 104. The digital IF signal thus produced has the DC component thereof canceled by the DC canceling circuit 105, and is supplied to the digital orthogonal demodulation circuit 106.

The digital orthogonal demodulation circuit 106 makes orthogonal demodulation of the digital IF signal with the use of a carrier signal of a predetermined frequency (carrier frequency) to provide a baseband OFDM signal. The orthogonal demodulation of the baseband OFDM signal provides a complex signal composed of a real-axis component (I-channel signal) and an imaginary-axis signal (Q-channel signal). The baseband OFDM signal from the digital orthogonal demodulation circuit 106 is supplied to the FFT calculation circuit 107 and synchronization circuit 109.

The FFT calculation circuit 107 makes FFT calculation of the baseband OFDM signal to extract a signal having been orthogonal-modulated to each sub-carrier, and provides it as an output.

The FFT calculation circuit 107 extracts a signal having an effective symbol length from one OFDM symbol, and makes FFT calculation of the extracted signal. More specifically, the FFT calculation circuit 107 removes a signal having a guard interval length from one OFDM symbol, and makes FFT calculation of the residual of the OFDM symbol. Signals for FFT calculation may be extracted from any arbitrary positions in one OFDM symbol if the signal extraction points are consecutive. Namely, the signal extraction will start at any position in a range from the leading boundary of the OFDM symbol (indicated with a reference A in FIG. 1) to the end of the guard interval (indicated with a reference B in FIG. 1) as shown in FIG. 1.

A signal extracted by the FFT calculation circuit 107 and having been modulated to each sub-carrier is a complex signal composed of a real-axis component (I-channel signal) and an imaginary-axis component (Q-channel signal). The signal extracted by the FFT calculation circuit 107 is supplied to the frame extraction circuit 108, synchronization circuit 109 and carrier demodulation circuit 110.

Based on the signal demodulated by the FFT calculation circuit 107, the frame extraction circuit 108 extracts boundaries of an OFDM transmission frame, while demodulating pilot signals such as CP, SP, etc. included in the OFDM transmission frame and transmission-control information such as TMCC, TPS, etc., and supplies the demodulated pilot signals and transmission-control information to each of the synchronization circuit 109 and transmission-control information demodulation circuit 121.

Using the base-band OFDM signal, signals having been modulated to the sub-carriers after demodulated by the FFT calculation circuit 107, pilot signals such as CP, SP, etc. detected by the frame extraction circuit 108 and channel select signal supplied from the channel selection circuit 122, the synchronization circuit 109 calculates boundaries of the OFDM symbol, and sets an FFT-calculation start timing for the FFT calculation circuit 107.

The carrier demodulation circuit 110 is supplied with signals demodulated from the sub-carrier outputs from the FFT calculation circuit 107, and makes carrier demodulation of the supplied signal. For demodulation of an ISDB-$T_{SB}$-based OFDM signal, for example, the carrier demodulation circuit 110 will make differential demodulation of the signal by the DQPSK technique or synchronous demodulation by the QPSK, 16QAM or 64QAM technique.

The carrier-demodulated signal undergoes frequency-directional deinterleaving by the frequency deinterleaving circuit 111, then time-directional deinterleaving by the time deinterleaving circuit 112, and is supplied o the demapping circuit 113.

The demapping circuit 113 demaps the carrier-demodulated signal (complex signal) to restore the transmission data series. For demodulation of an ISDB-$T_{SB}$-based OFDM signal, for example, the demapping circuit 113 will make a demapping corresponding to the QPSK, 16QAM or 64QAM technique.

Being passed through the bit deinterleaving circuit 114, depuncture circuit 115, Viterbi circuit 116, byte deinterleaving circuit 117 and spread-signal canceling circuit 118, the transmission data series from the demapping circuit 113 undergoes deinterleaving corresponding to a bit deinterleaving for distribution of a multi-valued symbol error, depuncturing corresponding to puncturing done for reduction of transmission bits, Viterbi decoding for decoding a convolution-encoded bit string, deinterleaving in bytes, and energy despreading corresponding to the energy spreading, and the transmission data series thus processed is supplied to the transport stream generation circuit 119.

The transport stream generation circuit 119 inserts data defined by each broadcasting technique, such as null packet, in a predetermined position in a data stream. Also, the transport stream generation circuit 119 "smoothes" bit spaces in an intermittently supplied data stream to provide a temporally continuous stream. The transmission data series thus smoothed is supplied to the RS decoding circuit 120.

The RS decoding circuit 120 makes Reed-Solomon decoding of the supplied transmission data series to provide the transmission data series thus decoded as a transport stream defined in the MPEG-2 Systems.

The transmission-control information decoding circuit 121 decodes transmission-control information having been modulated in a predetermined position in the OFDM transmission frame, such as TMCC or TPS. The decoded transmission-control information is supplied to the carrier demodulation circuit 110, time deinterleaving circuit 112, demapping circuit 113, bit deinterleaving circuit 114 and transport stream generation circuit 119, and used to control the demodulation, reproduction, etc. effected in these circuits.

Note here that such an OFDM receiver has to synchronize OFDM symbols, digital orthogonal-demodulated carrier frequencies, and sampling clocks for the A-D conversion circuit, for example. For such kinds of synchronization, it is first necessary to detect a clock-frequency error.

The "clock-frequency error" is a difference in frequency between a transmission clock for a received OFDM symbol and a sampling clock for quantization of the received OFDM signal. That is, the clock-frequency error is a difference in frequency between a reference clock at the transmitter side and a reference clock at the receiver side.

A clock-frequency error can be detected by detecting an OFDM symbol boundary position through calculation of an autocorrelation of the OFDM signals and converting the boundary interval into a clock-frequency error, or by converting a position in which a pilot signal is inserted into an OFDM symbol period. In any case, however, it is difficult to detect a clock-frequency error accurately.

DISCLOSURE OF THE INVENTION

Accordingly, the present invention has an object to overcome the above-mentioned drawbacks of the related art by providing an OFDM demodulator capable of an accurate detection of a clock-frequency error.

The above object can be attained by providing an OFDM demodulator for demodulating an orthogonal frequency division multiplex (OFDM) signal whose unit of transmission is a transmission symbol including effective symbols generated by making time division of an information series and modulating the information into a plurality of sub-carriers and a guard interval generated by copying the signal waveform of a part of the effective symbols, the apparatus including, according to the present invention, an analog-digital converting circuit for sampling the OFDM signal with a sampling clock of a predetermined frequency and converting the sampled OFDM signal into digital data; a symbol-boundary measuring circuit for measuring a value indicative of a boundary between transmission symbols of the OFDM signal with the sampling clock; a plurality of change-rate calculating circuit each of which calculates a time-change rate of the measured value; and a clock-frequency error calculating circuit for calculating a clock-frequency error that is a difference between the transmission clock for the OFDM signal and the sampling clock, the change-rate calculating circuit having respective time intervals set for calculation of the time change rate and being different in time interval from each other; and the clock-frequency error calculating circuit calculating the clock-frequency error on the basis of a plurality of time-change rates from the change-rate calculating circuit, respectively.

The above OFDM demodulator according to the present invention can accurately calculate a clock-frequency error even in a worse receiving environment.

Also the above object can be attained by providing an OFDM demodulator for demodulating an orthogonal frequency division multiplex (OFDM) signal whose unit of transmission is a transmission symbol including effective symbols generated by making time division of an information series and modulating the information into a plurality of sub-carriers and a guard interval generated by copying the signal waveform of a part of the effective symbols, the apparatus including, according to the present invention, an analog-digital converting circuit for sampling the OFDM signal with a sampling clock of a predetermined frequency and converting the sampled OFDM signal into digital data; a symbol-boundary measuring circuit for measuring a value indicative of a boundary between transmission symbols of the OFDM signal with the sampling clock; a change-rate calculating circuit for calculating a time-change rate of the measured value at every M transmission symbols (M is a natural number); a histogram generating circuit being supplied with the time-change rate at every M transmission symbols, classifying the time-change rate and generating a histogram of frequencies of detection of time-change rates in each class; and a clock-frequency error calculating circuit for calculating a clock-frequency error that is a difference between the transmission clock for the OFDM signal and the sampling clock on the basis of the histogram.

Also the above object can be attained by providing an OFDM demodulator demodulating an orthogonal frequency division multiplex (OFDM) signal whose unit of transmission is a transmission symbol including effective symbols generated by making time division of an information series and modulating the information into a plurality of sub-carriers and a guard interval generated by copying the signal waveform of a part of the effective symbols, the apparatus including, according to the present invention, an analog-digital converting circuit for sampling the OFDM signal with a sampling clock of a predetermined frequency and converting the sampled OFDM signal into digital data; a symbol-boundary measuring circuit for measuring a value indicative of a boundary between transmission symbols of the OFDM signal with the sampling clock; a plurality of change-rate calculating circuit each of which calculates a time-change rate of the measured value at every M transmission symbols (M is a natural number); a histogram generating circuit for classifying the time-change rates and generating a histogram of frequencies of detection of time-change rates in each class; and a clock-frequency error calculating circuit for calculating a clock-frequency error that is a difference between the transmission clock for the OFDM signal and the sampling clock on the basis of the histogram, the time-change rate calculating time intervals being set in units of being a multiple of the number of M symbols in the change-rate calculating circuit and being different from each other; and the histogram generating circuit being supplied with the time-change rates from the plurality of change-rate calculating circuit at every time intervals set for the change-rate calculating circuit, classifying the supplied time-change rates and generating a histogram indicating the detection frequency of the time-change rate in each class.

Thus, the OFDM demodulator according to the present invention cal calculate an accurate clock-frequency error.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIG. 5 is a timing diagram of each signal in the guard correlation/peak detection circuit.

BEST MODE FOR CARRYING OUT THE INVENTION

Overview of the OFDM Receiver

Figure 1:
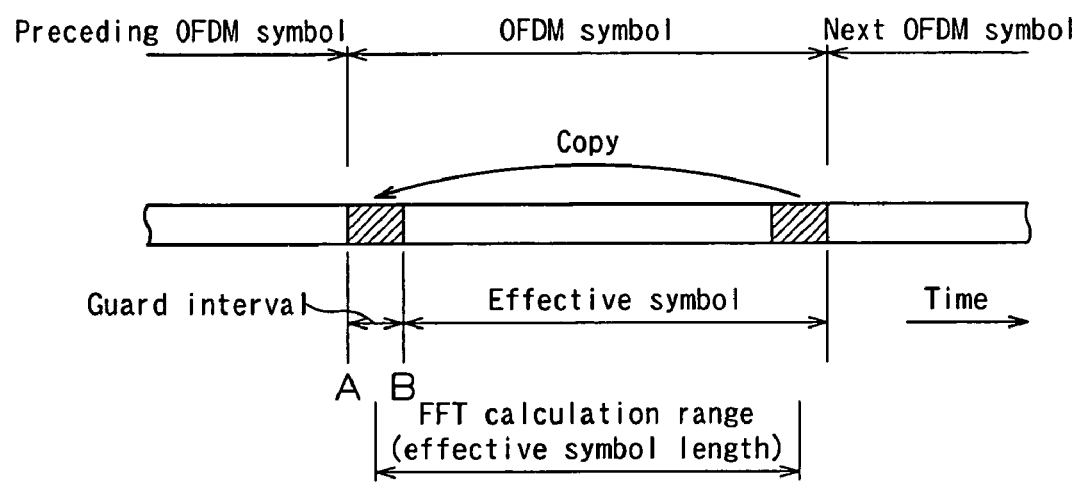
FIG. 1 explains the transmission symbol used in the OFDM technique.
Figure 2:
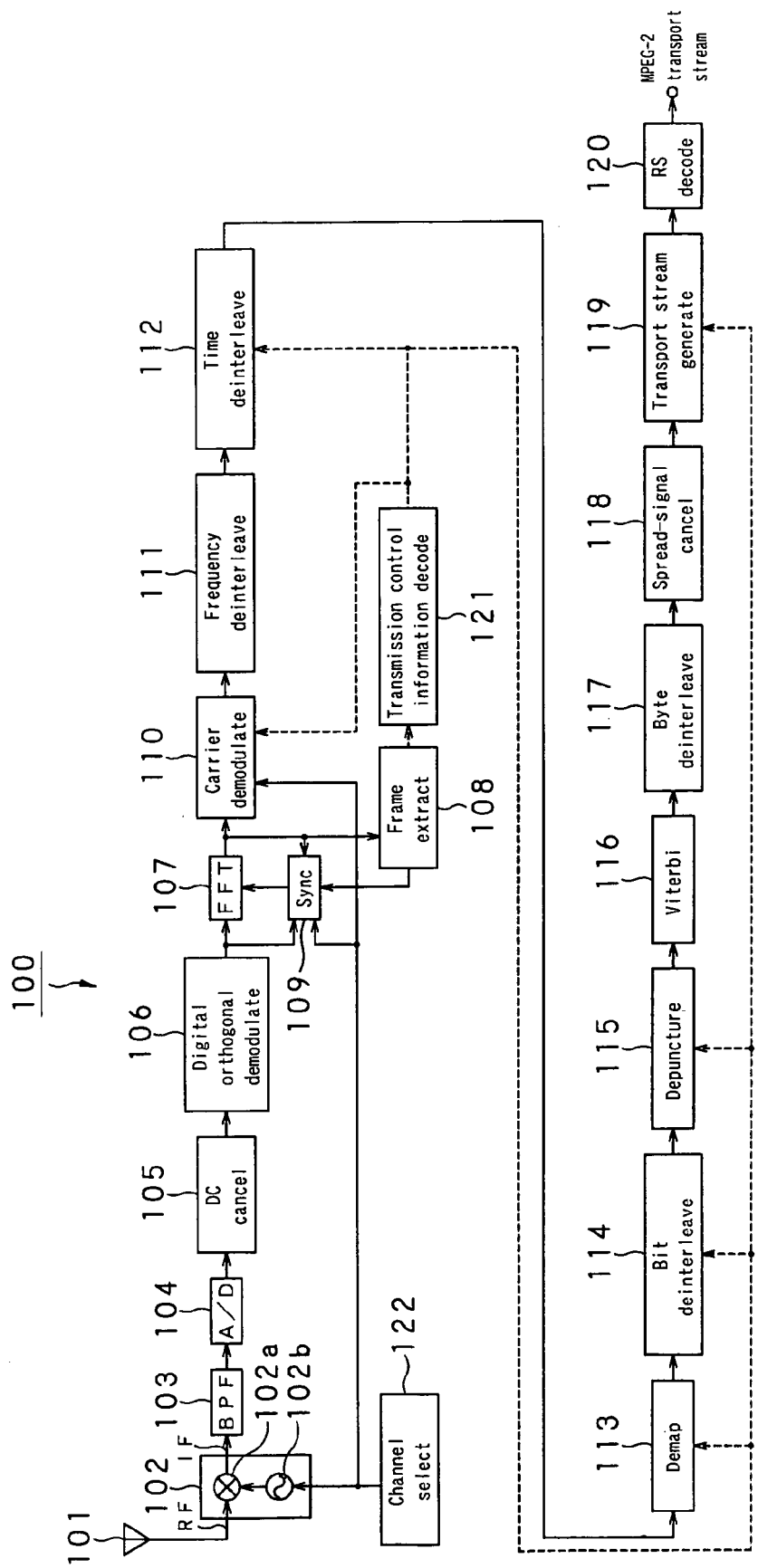
FIG. 2 is a block diagram of the conventional OFDM receiver.
Figure 3:
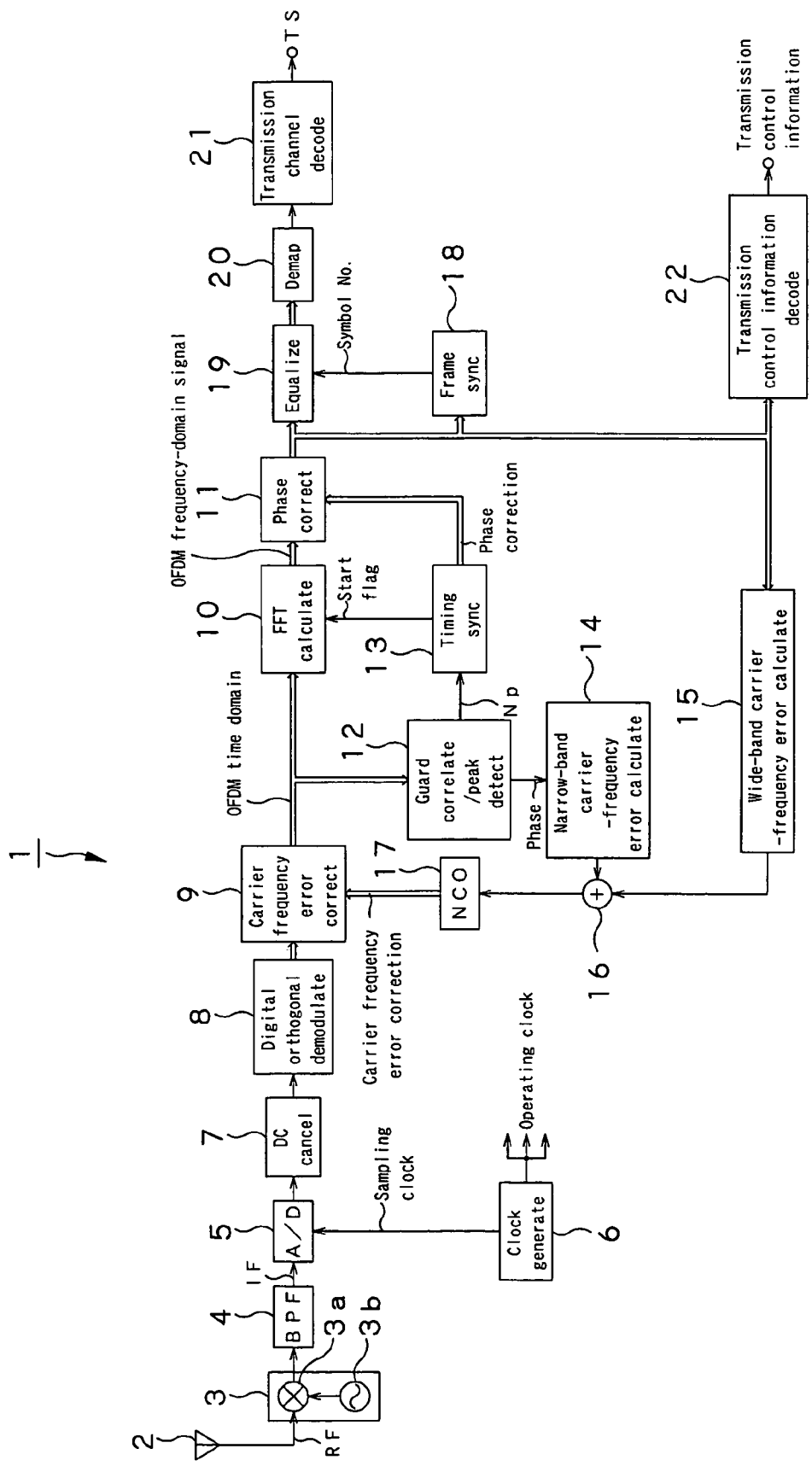
FIG. 3 is a block diagram of an OFDM receiver as an embodiment of the present invention.

FIG. 3 is a block diagram of the OFDM receiver according to the first embodiment of the present invention. It should be noted that a signal indicated with a doublet in FIG. 3 is a complex signal.

As show in FIG. 3, the OFDM receiver, generally indicated with a reference 1, as the embodiment of the present invention includes an antenna 2, tuner 3, band-pass filter (BPF) 4, A-D conversion circuit 5, clock generation circuit 6, DC canceling circuit 7, digital orthogonal demodulation circuit 8, carrier-frequency error correction circuit 9, FFT calculation circuit 10, phase correction circuit 11, guard correlation/peak detection circuit 12, timing synchronization circuit 13, narrow-band carrier error calculation circuit 14, wide-band carrier error calculation circuit 15, addition circuit 16, numerical-control oscillation (NCO) circuit 17, frame synchronization circuit 18, equalization circuit 19, demapping circuit 20, transmission-channel decoding circuit 21, and a transmission-control information decoding circuit 22.

Digital broadcast waves from a broadcast station are received by the antenna 2 of the OFDM receiver 1, and supplied as a RF signal to the tuner 3.

The RF signal received by the antenna 2 is converted in frequency to an IF signal by the tuner 3 including the multiplier 3a and local oscillator 3b, and supplied to the BPF 4. The IF signal output from the tuner 3 is filtered by the BPF 4 and then supplied to the A-D conversion circuit 5.

The A-D conversion circuit 5 samples the IF signal with a clock supplied from the clock generation circuit 6, and digitizes the IF signal. The IF signal thus digitized by the A-D conversion circuit 5 is supplied to the DC canceling circuit 7 where it will have the DC component thereof canceled, and the signal is supplied to the digital orthogonal demodulation circuit 8. The digital orthogonal demodulation circuit 8 makes orthogonal demodulation of the digital IF signal with the use of a two-phase carrier signal of a predetermined carrier frequency, and provides a base-band OFDM signal as an output. An OFDM time-domain signal output from the digital orthogonal demodulation circuit 8 is supplied to the carrier-frequency error correction circuit 9.

Note here that for the digital orthogonal demodulation, the digital orthogonal demodulation circuit 8 needs a two-phase signal having a −Sin component and Cos component as a carrier signal. On this account, in the OFDM receiver 1, the frequency of the sampling clock supplied to the A-D conversion circuit 5 is made four times higher than the center frequency $f_{1F}$ of the IF signal to generate a two-phase carrier signal for supply to the digital orthogonal demodulation circuit 8.

Also, in the OFDM receiver 1, after completion of the digital orthogonal demodulation, a data series of a clock of $4f_{1F}$ is down-sampled to ¼ to equalize the number of samples of the effective symbol having undergone the digital orthogonal demodulation to the number (Nu) of sub-carriers. That is, the clock for the data series subjected to the digital orthogonal demodulation has a frequency that is 1/sub-carrier space. Also, the down-sampling rate after the digital orthogonal demodulation may be ½ to make FFT calculation with the number of samples, double the normal one, and the data series be further down-sampled to ½ after completion of the FFT calculation. By making the FFT calculation with the number of samples, double the normal one, it is possible to extract, by the FFT calculation, a signal in a two-time wider frequency band and thus reduce the circuit scale of the low-pass filter circuit for the digital orthogonal demodulation. It should be noted that for each of the downstream circuits to process the over-sampled data series, the number (Nu) of samples of the effective symbol having undergone the digital orthogonal demodulation may be $2^n$ times (n is a natural number) larger than the number of sub-carriers.

The clock generation circuit 6 supplies the A-D conversion circuit 5 with a clock of the aforementioned frequency, and each of the circuits of the OFDM receiver 1 with an operation clock for the data series having undergone the digital orthogonal demodulation (a clock of a frequency equal to a quarter of the frequency of the clock for supply to the A-D conversion circuit 5, for example, a clock of a frequency equal to 1/sub-carrier space).

Note that the operation clock generated by the clock generation circuit 6 is a free-running clock not synchronous with a transmission clock for the received OFDM signal. That is, the operation clock from the clock generation circuit 6 free-runs without synchronization in frequency and phase with the transmission clock by PLL or the like. The operation clock can free-run because the timing synchronization circuit 13 detects a frequency error between the OFDM signal transmission clock and the operation clock, and cancels the frequency error on the basis of the frequency error component by a feed-forwarding made in the system downstream of the timing synchronization circuit 13. Although in this OFDM receiver 1, the clock generation circuit 6 generates an asynchronous free-running clock as above, the present invention is applicable to a device that can vary the operation flock frequency by a feedback control.

Also, the base-band OFDM signal output from the digital orthogonal demodulation circuit 8 is a so-called time-domain signal not yet subject to FFT calculation. Thus, the yet-to-FFT-calculated base-band signal will be referred to as "OFDM time-domain signal" hereunder. The OFDM time-domain signal is orthogonal-demodulated to provide a complex signal composed of a real-axis component (I-channel signal) and an imaginary-axis component (Q-channel signal).

The carrier-frequency error correction circuit 9 makes complex multiplication of a carrier-frequency error correction signal output from the NCO 17 by the OFDM time-domain signal having undergone the digital orthogonal demodulation to correct a carrier-frequency error of the OFDM time-domain signal. That is, the carrier-frequency error correction circuit 9 corrects an error caused by a difference between the frequency of the carrier signal used for the digital orthogonal demodulation and the center frequency of the transmitted OFDM signal (IF signal). The OFDM time-domain signal having the carrier-frequency error thereof corrected by the carrier-frequency error correction circuit 9 is supplied to the FFT calculation circuit 10 and guard correlation/peak detection circuit 12.

The FFT calculation circuit 10 extracts a signal having an effective symbol length from one OFDM symbol, that is, extracts signals, except for samples for the guard interval, from all samples of one OFDM symbol, and makes FFT calculation of the signal thus extracted. The timing in which a range of extraction is identified (start timing of the FFT calculation) is set with a start flag supplied from the timing synchronization circuit 13. The FFT calculation circuit 10 makes FFT calculation of one OFDM symbol once, and extracts a signal component modulated in each sub-carrier in the OFDM symbol. The signal from the FFT calculation circuit 10 is a so-called frequency-domain one after FFT-calculated. Thus, the signal having undergone the FFT calculation is called "OFDM frequency-domain signal". The OFDM frequency-domain signal from the FFT calculation circuit 10 is a complex signal composed of a real-axis signal (I-channel signal) and imaginary-axis signal (Q-channel signal) similarly to the OFDM time-domain signal. The OFDM frequency-domain signal is supplied to the phase correction circuit 11.

The phase correction circuit 11 corrects a phase-rotated component that will be caused in the OFDM frequency-domain signal by a shift of an actual boundary position of an OFDM symbol from the start timing of the FFT calculation. The phase correction circuit 11 corrects a phase shift caused with a precision smaller than the sampling cycle. More specifically, the phase correction circuit 11 corrects a phase rotation of the PFDM frequency-domain signal output from the FFT calculation circuit 10 by making complex multiplication of a phase correction signal (complex signal) supplied from the timing synchronization circuit 13. The OFDM frequency-domain signal corrected in phase rotation is supplied to the wideband carrier error calculation circuit 15, frame synchronization circuit 18, equalization circuit 19 and transmission-control information decoding circuit 22.

The guard correlation/peak detection circuit 12 is supplied with the OFDM time-domain signal. The guard correlation/peak detection circuit 12 will determine the value of a correlation between the supplied OFDM time-domain signal and OFDM time-domain signal delayed by the effective symbol. It should be noted here that the length of time for which the correlation is to be determined is set to the length of the guard interval time. Thus, the signal indicating the correlation value (will be referred to as "guard correlation signal" hereunder) has a peak precisely in the boundary position of the OFDM symbol. The guard correlation/peak detection circuit 12 detects the position where the guard correlation signal has a peak, and outputs a value (peak timing Np) identifying the timing of the peak position.

Also, the guard correlation/peak detection circuit 12 also detects a value indicating a phase of a correlation value in a peak position of the guard correlation signal. The phase value is zero when the center frequency of the OFDM signal completely coincides with the carrier frequency having undergone the digital orthogonal decoding. However, when there is no coincidence between the center frequency and carrier frequency, the phase value is rotated in phase correspondingly to the shift between the frequencies. That is, the phase value indicates a shift between the center frequency of the received OFDM signal and that of the OFDM signal after demodulated from the digital-orthogonal modulated state. However, since the phase value is fully rotated at a frequency interval of the sub-carrier (for example, 0.992 kHz in the mode 3 of ISDB-TSB), it will be information whose precision is less than $\pm\frac{1}{2}$ of the sub-carrier frequency interval.

The peak timing value Np from the guard correlation/peak detection circuit 12 is supplied to the timing synchronization circuit 13, and the phase of the correlation value at the boundary of the OFDM symbol is supplied to the narrow-band carrier-error calculation circuit 14.

The timing synchronization circuit 13 determines a start timing of FFT calculation on the basis of a boundary position of the OFDM symbol, estimated by filtering the peak timing value Np from the guard correlation/peak detection circuit 12, for example. The FFT-calculation start timing is supplied as a start flag to the FFT calculation circuit 10. The FFT calculation circuit 10 will make FFT calculation by extracting a signal within the range of FFT calculation from the supplied OFDM time-domain signal on the basis of the start flag. Also, the timing synchronization circuit 13 calculates the amount of a phase rotation taking place due to a time lag between the estimated boundary position of the OFDM symbol and the timing in which the FFT calculation is to be started, generates a phase correction signal (complex signal) on the basis of the calculated amount of phase rotation, and supplies the phase correction signal to the phase correction circuit 11.

The narrow-band carrier-error calculation circuit 14 calculates, based on the phase of the correlation value in the boundary position of the OFDM symbol, a narrow-band carrier-frequency error component indicating a narrow-band component of a shift of the center frequency used for the digital orthogonal demodulation. More particularly, the narrow-band carrier-frequency error component is a shift of the center frequency, whose precision is less than $\pm\frac{1}{2}$ of the frequency space of the sub-carrier. The narrow-band carrier-frequency error component determined by the narrow-band carrier-error calculation circuit 14 is supplied to the addition circuit 16.

The wideband carrier-error calculation circuit 15 calculates, based on the OFDM frequency-domain signal from the phase correction circuit 11, a narrow-band carrier-frequency error component indicating a wide-band component of a shift of the center frequency used for the digital orthogonal demodulation. The wide-band carrier-frequency error component is a shift of the center frequency, whose precision is the sub-carrier frequency space.

The wideband carrier-frequency error component determined by the wideband carrier-error calculation circuit 15 is supplied to the addition circuit 16.

The addition circuit 16 adds the narrow-band carrier-frequency error component calculated by the narrow-band carrier-error detection circuit 14 and the wideband carrier-frequency error component calculated by the wideband carrier-error calculation circuit 15 to calculate a total shift of the center frequency of the baseband OFDM signal supplied from the carrier-frequency error correction circuit 9. The addition circuit 16 outputs the calculated total shift of the center frequency as a frequency error value. The frequency error value from the addition circuit 16 is supplied to the NCO 17.

The NCO 17 is a so-called numerical-controlled oscillator, and generates a carrier-frequency error correction signal of which the oscillation frequency is increased or decreased correspondingly to the value of a frequency error from the addition circuit 16. The NCO 17 increases the oscillation frequency of a carrier-frequency error correction signal when the supplied frequency-error value is positive, and decreases the oscillation frequency when the supplied frequency-error value is negative. The NCO 17 provides the above control to generate a carrier-frequency error correction signal of which the oscillation frequency becomes stable when the frequency-error value is zero.

The frame synchronization circuit 18 detects a synchronization word inserted in a predetermined position in an OFDM transmission frame to detect the start timing of the OFDM transmission frame. The frame synchronization circuit 18 identifies a symbol number assigned to each OFDM symbol on the basis of the start timing of the OFDM transmission frame, and supplies the symbol number to the equalization circuit 19 etc.

The equalization circuit 19 makes a so-called equalization of the OFDM frequency-domain signal. The equalization circuit 19 detects, based on the symbol number supplied from the frame synchronization circuit 18, a pilot signal called "scattered pilots (SP)" inserted in the OFDM frequency-domain signal. The equalization circuit 19 estimates the frequency response of the transmission channel from the detected SP signal, and multiplies the OFDM frequency-domain signal by a reciprocal of the estimated transmission-channel frequency response. The equalization circuit 19 can cancel a distortion caused by the influence of the transmission channel and restore the transmitted signal. The OFDM frequency-domain signal equalized by the equalization circuit 19 is supplied to the demapping circuit 20.

The demapping circuit 20 makes a data demapping of the equalized OFDM frequency-domain signal (complex signal), corresponding to the technique of demodulation such as QPSK, 16QAM or 64QAM, used for the OFDM frequency-domain signal, to restore the transmission data. The transmission data from the demapping circuit 20 is supplied to the transmission-channel decoding circuit 21.

The transmission-channel decoding circuit 21 makes transmission-channel decoding of the supplied transmission data, corresponding to the broadcasting method by which the transmission data has been broadcast. For example, the transmission-channel decoding circuit 21 makes a time deinterleaving corresponding to a time-directional interleaving, frequency deinterleaving corresponding to a frequency-directional interleaving, deinterleaving corresponding to a bit interleaving for distributing multi-valued symbol error, depucturing corresponding to a pucturing for reduction of transmission bits, Viterbi decoding for decoding a convolution-encoded bit string, deinterleaving in bytes, energy despreading corresponding to the energy spreading, error correction corresponding to the RS (Reed-Solomon) coding, etc.

The transmission data having undergone the above transmission-channel decoding is outputted as a transport stream defined in the MPEG-2 Systems, for example.

The transmission-control information decoding circuit 22 decodes transmission-control information such as TMCC, TPS or the like, modulated in a predetermined position in the OFDM transmission frame.

Guard Correlation/Peak Detection Circuit

Next, the guard correlation/peak detection circuit 12 will be illustrated and described.

Note that constants Nu, Ng and Ns (natural numbers) will be used in the following illustration and description of the guard correlation/peak detection circuit 12. The constant Nu is the number of samples in one effective symbol. The constant Ng is the number of samples in the guard interval. For example, when the length of the guard interval is ¼ of that of the effective symbol, Ng=Nu/4. The constant Ns is the number of samples in one OFDM symbol. That is, Ns=Nu+Ng.

Figure 4:
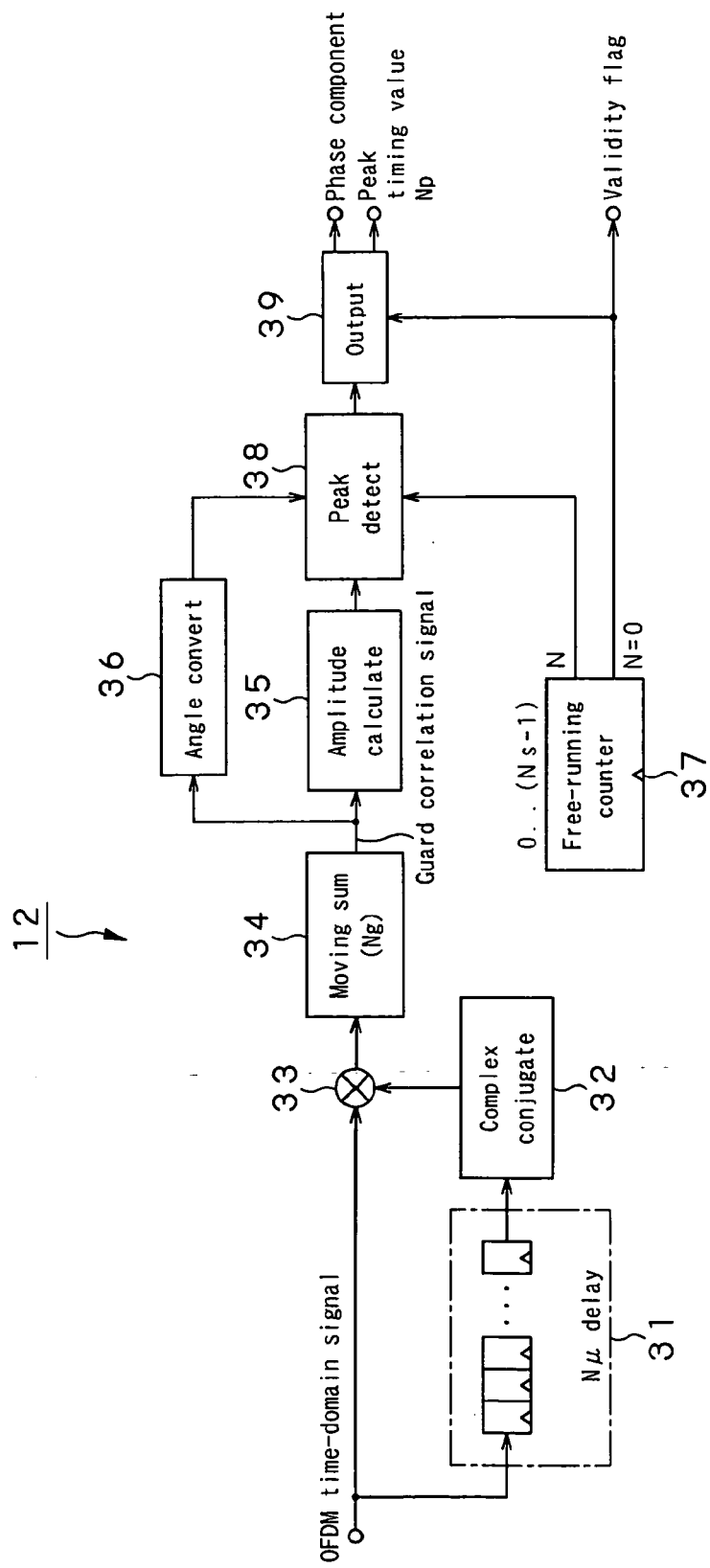
FIG. 4 is a block diagram of a guard correlation/peak detection circuit.

FIG. 4 is a block diagram of the guard correlation/peak detection circuit 12, and FIG. 5 is a timing diagram of various signals in the guard correlation/peak detection circuit 12.

As shown in FIG. 4, the guard correlation/peak detection circuit 12 includes a delay circuit 31, complex conjugate circuit 32, multiplication circuit 33, moving-sum circuit 34, amplitude calculation circuit 35, angle conversion circuit 36, free-running counter 37, peak detection circuit 38, and an output circuit 39.

The OFDM time-domain signal (see FIG. 5A) from the carrier-frequency error correction circuit 9 is supplied to the delay circuit 31 and multiplication circuit 33. The delay circuit 31 is a shift register formed from Nu register groups to delay the input OFDM time-domain signal by the effective symbol time. The OFDM time-domain signal (see FIG. 5B) delayed by the effective symbol by the delay circuit 31 is supplied to the complex conjugate circuit 32.

The complex conjugate circuit 32 calculates a complex conjugate of the OFDM time-domain signal delayed by the effective symbol time, and supplies it to the multiplication circuit 33.

The multiplication circuit 33 multiplies the OFDM time-domain signal (see FIG. 5A) and the complex conjugate of the OFDM time-domain signal delayed by the effective symbol time (see FIG. 5B) at every one sample. The result of the multiplication is supplied to the moving-sum circuit 34.

The moving-sum circuit 34 includes a shift register formed for Ng register groups and an adder to calculate a sum of values in the registers, for example. For each of the Ng samples, it makes moving-sum calculation of the results of multiplication sequentially supplied at every one sample. The moving-sum circuit 34 will output a guard correlation signal (see FIG. 5C) indicating the correlation between the OFDM time-domain signal and the OFDM time-domain signal delayed by the effective symbol (Nu samples). The guard correlation signal from the moving-sum circuit 34 is supplied to the amplitude calculation circuit 35 and angle conversion circuit 36.

The amplitude calculation circuit 35 determines an amplitude component of the guard correlation signal by squaring the real-number part and imaginary-number part, respectively, of the guard correlation signal, and adding the squares and calculating a square root of the result of the addition. The amplitude component of the guard correlation signal is supplied to the peak detection circuit 38.

The angle conversion circuit 36 determines a phase component of the guard correlation signal by making Tan−1 calculation of the real-number part and imaginary-number part of the guard correlation signal. The phase component of the guard correlation signal is supplied to the peak detection circuit 38.

The free-running counter 37 counts the operation clock. The count N of the free-running counter 37 is incremented in steps of one in a range from 0 to Ns−1, and will return to zero when it exceeds Ns−1 (as in FIG. 5D). That is to say, the free-running counter 37 is a cyclic counter whose cycle is the number of samples in the OFDM symbol period. The count N of the free-running counter 37 is supplied to the peak detection circuit 38.

The peak detection circuit 38 detects a point where the amplitude of the guard correlation signal is highest in one cycle (0 to Ns−1) of the free-running counter 37, and detects a count at that point. When the count of the free-running counter 37 shifts to a next cycle, the peak detection circuit 38 will detect a new point where the guard correlation signal has a high amplitude. The count detected by the peak detection circuit 38 is a peak timing Np indicative of a time at which the guard correlation signal attains its peak (peak time). Also, the peak detection circuit 38 detects a phase component of the guard correlation signal at the peak time, and supplies the detected phase component to the output circuit 39.

The output circuit 39 takes in the count from the peak detection circuit 38 and stores it into an internal register in a timing when the count N of the free-running counter 37 becomes zero, and sets the count to a state in which is can be outputted to outside (see FIG. 5E). The count stored in the register is supplied as information indicative of the peak time of the guard correlation signal (peak timing Np) to the timing synchronization circuit 13 located downstream. Similarly, the output circuit 39 takes in the phase component from the peak detection circuit 38 in a timing when the count N of the free-running counter 37 becomes zero, and stores it into the internal register, and sets the phase component to a state in which it can be outputted to outside. The phase component stored in the register is supplied to the narrowband carrier-error calculation circuit 14 located downstream.

Also, the free-running counter 37 issues a validity flag that becomes High when the count N becomes zero (see FIG. 5F). The validity flag indicates a timing of issuing the peak timing Np and phase value to the downstream circuit.

Note that in the guard correlation/peak detection circuit 12, the free-running counter 37 has the cyclic timing thereof adjusted so that the timing in which the count N changes from the maximum value (Ns−1) to zero and timing in which the guard correlation signal attains its peak (boundary timing of the OFDM symbol) will be about a half period off the OFDM symbol time. That is, the cyclic timing is adjusted for the peak timing Np to be about ½ of the maximum count (Ns−1).

The reason for the above adjustment will be explained herebelow. The peak detection cycle of the peak detection circuit 38 ranges from a timing in which the count of the free-running counter 37 becomes zero to a timing in which the count becomes Ns−1. The peak detection circuit 38 outputs the count when the amplitude of the guard correlation signal has attained its maximum value in the period as a peak timing Np. If the timing in which the cycle of the free-running counter 37 is updated (the count becomes zero) and the timing in which the amplitude of the guard correlation signal attains its maximum value are temporarily near each other, a highly correlative portion (peak-shaped portion), which would normally be caused by a preceding OFDM symbol, will be included in the peak detection in the period of a next OFDM symbol. In such a case, the peak of the guard correlation signal is not always constant because of various noises and errors but will possibly vary for each symbol, and so the highly correlative portion caused by the guard interval of the preceding OFDM symbol will possibly be determined as the position of the next OFDM symbol boundary. On this account, the peak timing Np is pre-adjusted to about ½ of the maximum value (Ns−1) of the preceding OFDM symbol, thereby preventing a highly correlative portion (peak-shaped) caused by the guard interval of the preceding OFDM symbol from being determined as the guard interval of the next OFDM symbol. Thus, it is possible to assure a stable peak position detection.

However, when there is a clock frequency error (difference between the transmission clock for the received OFDM signal and OFDM signal sampling clock), the peak timing Np will gradually move (for which the reason will be described in detail later). In such a case, the cyclic timing of the count N may appropriately be adjusted correspondingly to the clock frequency error.

Although in the guard correlation/peak detection circuit 12, the peak timing Np is generated in each OFDM symbol period, the peak timing Np may be generated in M (natural number) OFDM symbol periods, not in one OFDM symbol period. In this case, however, the valid flag should be made High (1) only once in the M OFDM symbol periods.

Timing Synchronization Circuit

Next, the timing synchronization circuit 13 will be illustrated and described.

Figure 6:
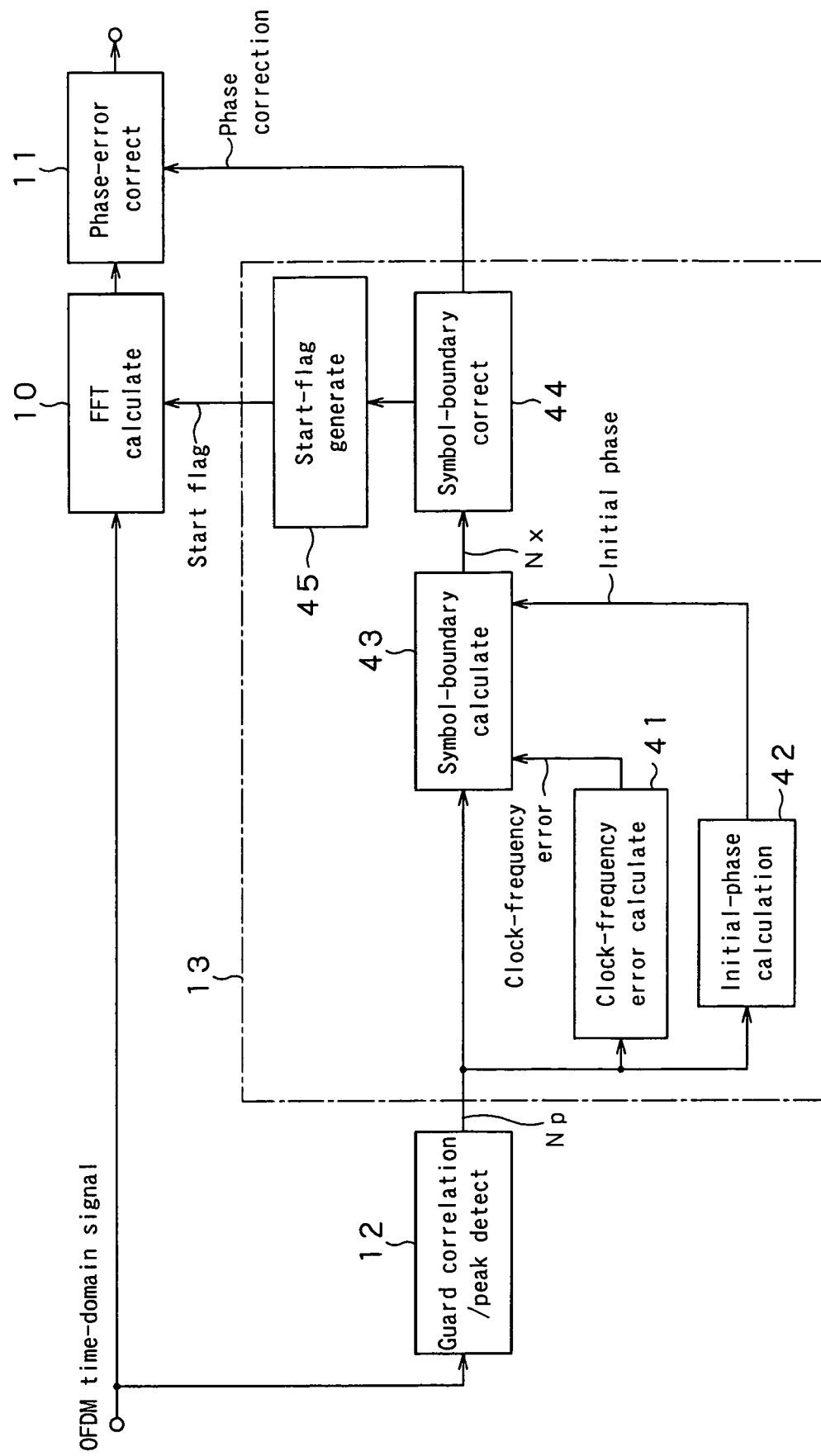
FIG. 6 is a block diagram of a timing synchronization circuit.

FIG. 6 shows the internal construction of the timing synchronization circuit 13.

As shown in FIG. 6, the timing synchronization circuit 13 includes a clock-frequency error calculation circuit 41, initial-value phase calculation circuit 42, symbol-boundary calculation circuit 43, symbol-boundary correction circuit 44, and a start-flag generation circuit 45.

The timing synchronization circuit 13 is supplied with the peak timing Np from the guard correlation/peak detection circuit 12 at every M OFDM symbols (M is a natural number). Each circuit in the timing synchronization circuit 13 has its operation controlled in an input timing of the peak timing Np (at every M OFDM symbols).

The clock-frequency error calculation circuit 41 calculates a clock-frequency error on the basis of the peak timing Np supplied at every M OFDM symbols, and supplies the calculated clock-frequency error to the symbol-boundary calculation circuit 43. It should be noted that the internal construction of the clock-frequency error calculation circuit 41 will be illustrated and described in detail later.

The initial-value phase calculation circuit 42 calculates an initial value of the peak timing Np on the basis of the peak timing Np supplied at every M OFDM symbols. The initial value is supplied to the symbol-boundary calculation circuit 43.

The symbol-boundary calculation circuit 43 filters the peak timing Np supplied at every M OFDM symbols, and calculates a symbol-boundary position Nx indicative of the boundary position of the OFDM symbol. The symbol-boundary position Nx is represented by a range of 0 to Ns as a cycle of the free-running counter 37 in the guard correlation/peak detection circuit 12. However, the symbol-boundary position Nx has a precision that is after the decimal point while the free-running counter 37 and peak timing Np have a precision of an integer. The symbol-boundary calculation circuit 43 calculates a phase difference between an output (symbol-boundary position Nx) and input (peak timing Np), and filters it on the basis of the phase error component to stabilize the output (symbol-boundary position Nx). The initial value from the initial-value phase calculation circuit 42 provides an initial output at the start of filtering, for example.

Also, the symbol-boundary calculation circuit 43 corrects a variation of the output (symbol-boundary position Nx) on the basis of the clock-frequency error by adding the clock-frequency error calculated by the clock-frequency error calculation circuit 41 to the phase error component. By determining a symbol-boundary position as well as a clock-frequency error as above, a symbol-boundary position can be determined with a higher accuracy.

The symbol-boundary position Nx from the symbol-boundary calculation circuit 43 is supplied to the symbol-boundary correction circuit 44.

The symbol-boundary correction circuit 44 detects an integer component of the symbol-boundary position Nx supplied at every M symbols, and calculates a start time for the FFT calculation. The calculated start time is supplied to the start-flag generation circuit 45. Also, the symbol-boundary correction circuit 44 determines a time lag, whose precision is smaller than the sampling clock cycle, between the symbol-boundary time and FFT-calculation start timing by detecting a component of the symbol-boundary position Nx, which is after the decimal point, and calculates, on the basis of the determined time lag, a phase rotation of a signal component included in each sub-carrier having undergone the FFT calculation. The calculated phase rotation is converted into a complex signal, and then supplied to the phase correction circuit 11.

The start-flag generation circuit 45 generates, based on the start time supplied from the symbol-boundary correction circuit 44, a start flag with which a timing of signal extraction (that is, an FFT-calculation start timing) for the FFT calculation is identified. This start flag is generated at each OFDM symbol. It should be noted that the start flag may be generated with a delay of a predetermined margin time from the supplied symbol-boundary position Nx. However, the margin time should never exceed at least the length of time of the guard interval. By generating the start flag with a delay of the predetermined margin time from the symbol-boundary time as above, it is possible to cancel an inter-symbol interference caused by the detection of a preceding symbol boundary which is a ghost, for example.

Clock-Frequency Error Calculation Circuit

Next, the clock-frequency error calculation circuit 41 will be illustrated and described in detail.

Figure 7:
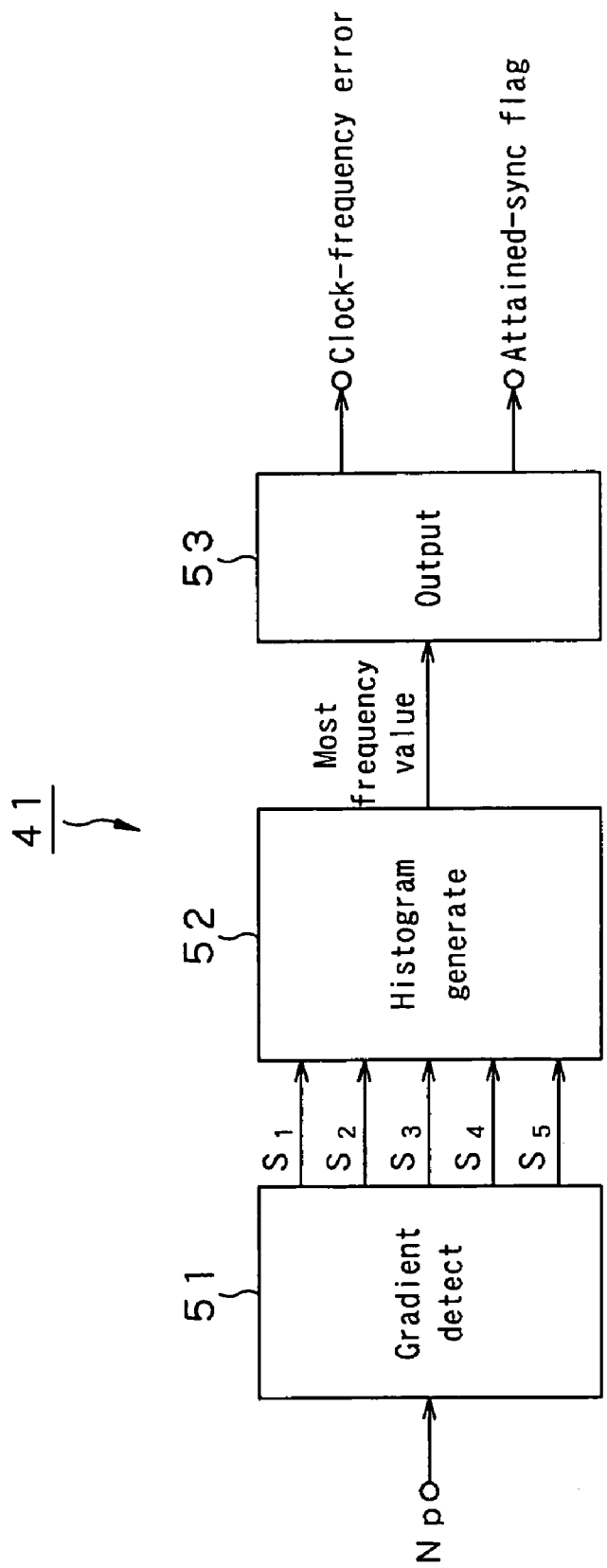
FIG. 7 is a block diagram of a clock-frequency error calculation circuit.

FIG. 7 shows the internal construction of the clock-frequency error calculation circuit 41.

As shown in FIG. 7, the clock-frequency error calculation circuit 41 includes a gradient detection circuit 51, histogram generation circuit 52, and an output circuit 53.

The gradient detection circuit 51 detects a time-change rate of the peak timing Np supplied from the guard correlation/peak detection circuit 12. That is, it detects a gradient S of the peak timing Np. The gradient detection circuit 51 has provided therein a plurality of detection paths different in period of gradient detection from each other and which provides a plurality of gradients S detected by the detection paths, respectively. In this embodiment, five detection paths are included in the gradient detection circuit 51 to provide five gradients S ($S_1$ to $S_5$).

The histogram generation circuit 52 classifies the gradients S from the gradient detection circuit 51 by level, and generates a histogram indicative of the frequencies of detection of the gradients S. The histogram generation circuit 52 detects the most frequent value of the generated histogram and supplies it to the output circuit 53.

The output circuit 53 judges, based on the supplied most frequent value, whether the most frequent value is stable or not. When the most frequent value is determined to be stable, the output circuit 53 generates an attained-synchronization flag and provides the most frequent value as a clock-frequency error to outside.

Each of the circuits in the clock-frequency error calculation circuit 41 will be described in detail below.

(Gradient Detection Circuit)

The gradient detection circuit 51 detects a time-change rate (gradient S) of the peak timing Np. The gradient S is proportional to a clock-frequency error. First, the reason for this proportion will be explained.

The peak timing Np supplied from the guard correlation/peak detection circuit 12 is a count by the free-running counter 37 at the peak timing of the guard correlation signal. The free-running counter 37 is a cyclic counter circuit in which the number of counts per cycle is set to the number of samples in one OFDM symbol.

Figure 8:
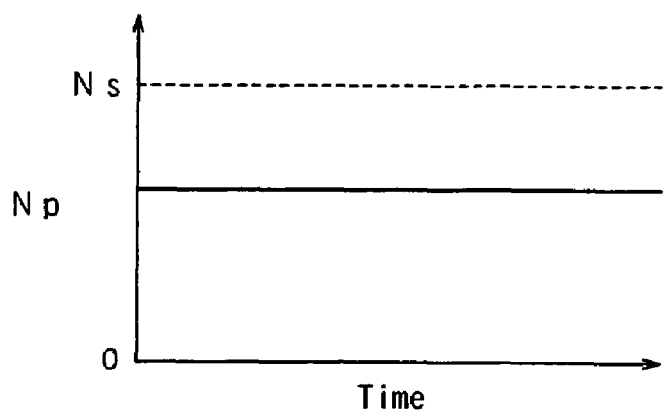
FIG. 8 shows a variation in output of a free-running counter when a transmission clock for a received OFDM signal and clock for the receiver are synchronous with each other.

When the symbol cycle of the received OFDM signal perfectly coincides with the cycle of the free-running counter 37, that is, when there is a complete coincidence in frequency between the transmission clock of the received OFDM signal and operation clock for the free-running counter 37, the peak timing Np will be constant as shown in FIG. 8.

Figure 9:
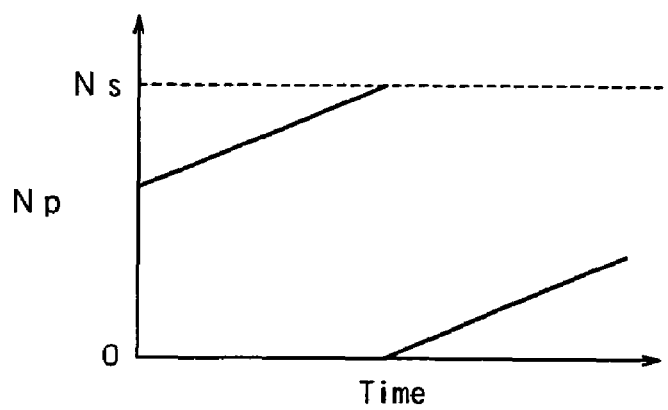
FIG. 9 shows a variation in output of a free-running counter when clock for the receiver is earlier than the transmission clock for the received OFDM signal.
Figure 10:
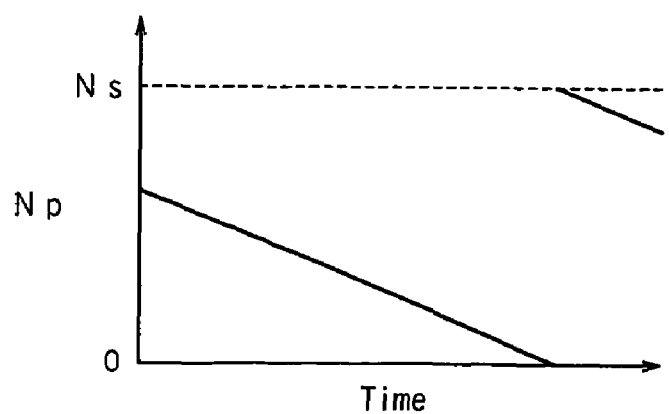
FIG. 10 shows a variation in output of a free-running counter when clock for the receiver is later than the transmission clock for the received OFDM signal.

On the contrary, when the cycle of the free-running counter 37 is shorter than the symbol cycle of the received OFDM signal, that is, when the operation clock for the free-running counter 37 is earlier than the transmission clock of the received OFDM signal, the peak signal Np will gradually increase as shown in FIG. 9. Also, if the cycle of the free-running counter 37 is longer than the symbol cycle of the received OFDM signal, namely, when the operation clock for the free-running counter 37 is later than the transmission clock of the received OFDM signal, the peak timing Np will gradually decrease as shown in FIG. 10.

Figure 11:
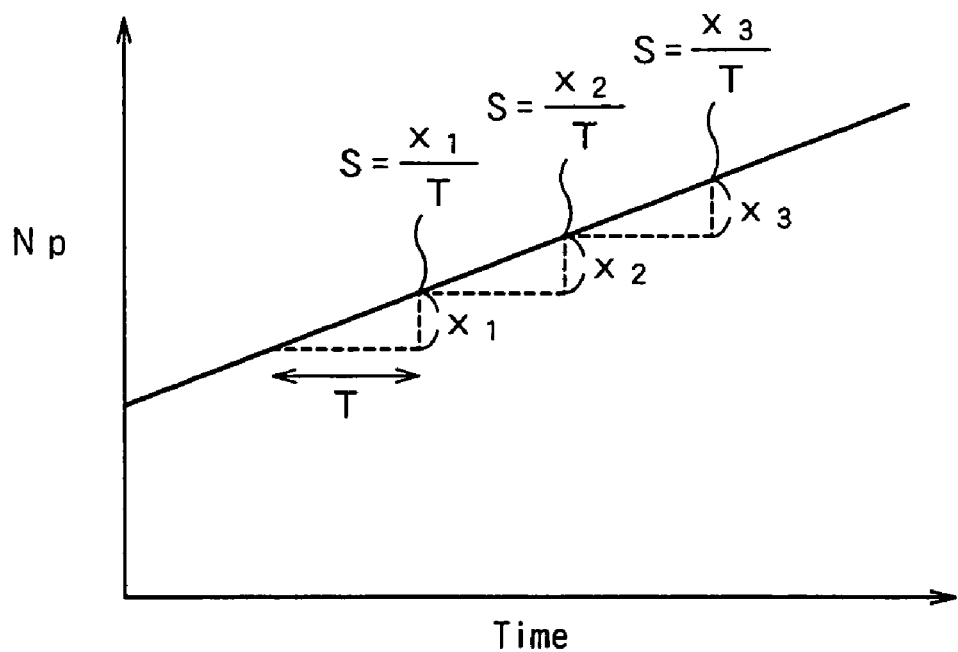
FIG. 11 shows a time change rate of the output from the free-running counter.

Thus, the time-change rate of the peak timing Np is proportional to a difference in frequency between the transmission clock of the received OFDM signal and sampling clock for the receiver. Therefore, the clock-frequency error can be determined by detecting a peak timing Np at every constant periods (T) of detection, and calculating a time-change rate (x/T) on the basis of a difference x between the peak timing Np detected at an arbitrary time ($\alpha$T) ($\alpha$ is an integer) and a peak timing Np detected at a preceding sampling time (($\alpha$-1) T), as shown in FIG. 11.

That is, a clock-frequency error can be determined by determining a gradient S of the peak timing Np. It should be noted that the gradient S of the peak timing Np can be said to be an interval between the received OFDM symbols measured with the operation clock for the receiver.

Note here that in the case of a digital terrestrial broadcasting, there is possibly a receiving environment called "frequency-selective fading (multipath reception and fading of received waves (main wave and a plurality of delayed waves))". In case an OFDM signal is received in the frequency-selective fading environment, the reception levels of the main and delayed waves vary cyclically. Thus, a detected peak position of a guard correlation will cyclically be switched in symbol-boundary position between the main and delayed waves. That is to say, when the reception level of the main wave is higher, the symbol-boundary position of the main wave is received. If the reception level of the delayed waves is higher, the symbol-boundary positions of the delayed waves will be detected.

Figure 12:
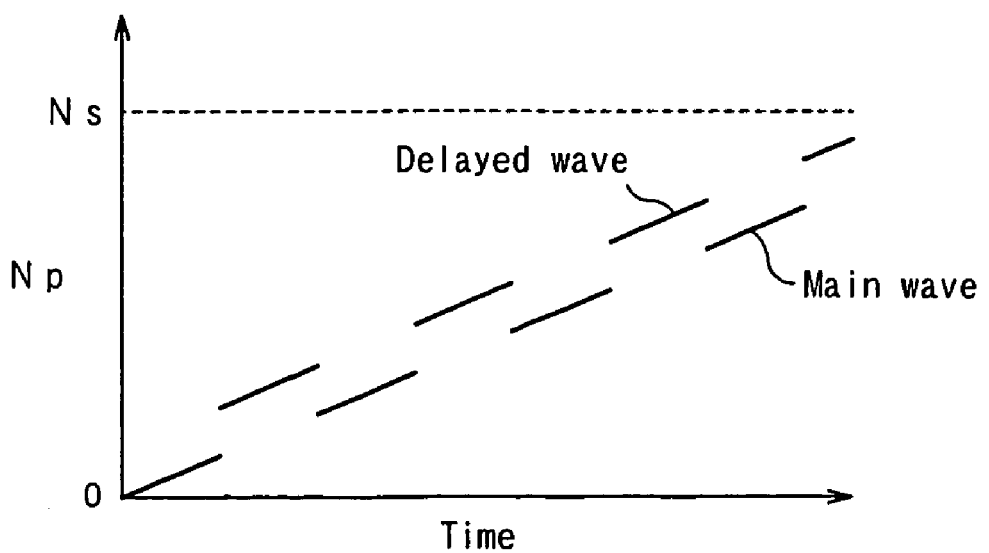
FIG. 12 shows a variation of the free-running counter output when a frequency-selective fading takes place and a clock-frequency error occurs.

In a frequency-selective fading state with a clock-frequency error takes place, the peak timing Np will have a time difference between the main and delay waves, which alternately increase and decrease at each constant cycle (fading cycle) as shown in FIG. 12. Also, the cycle at which the reception level is switched between those of the main and delayed waves due to a frequency-selective fading will vary depending upon the receiving environment, namely, will be alternately longer and shorter.

Figure 13:
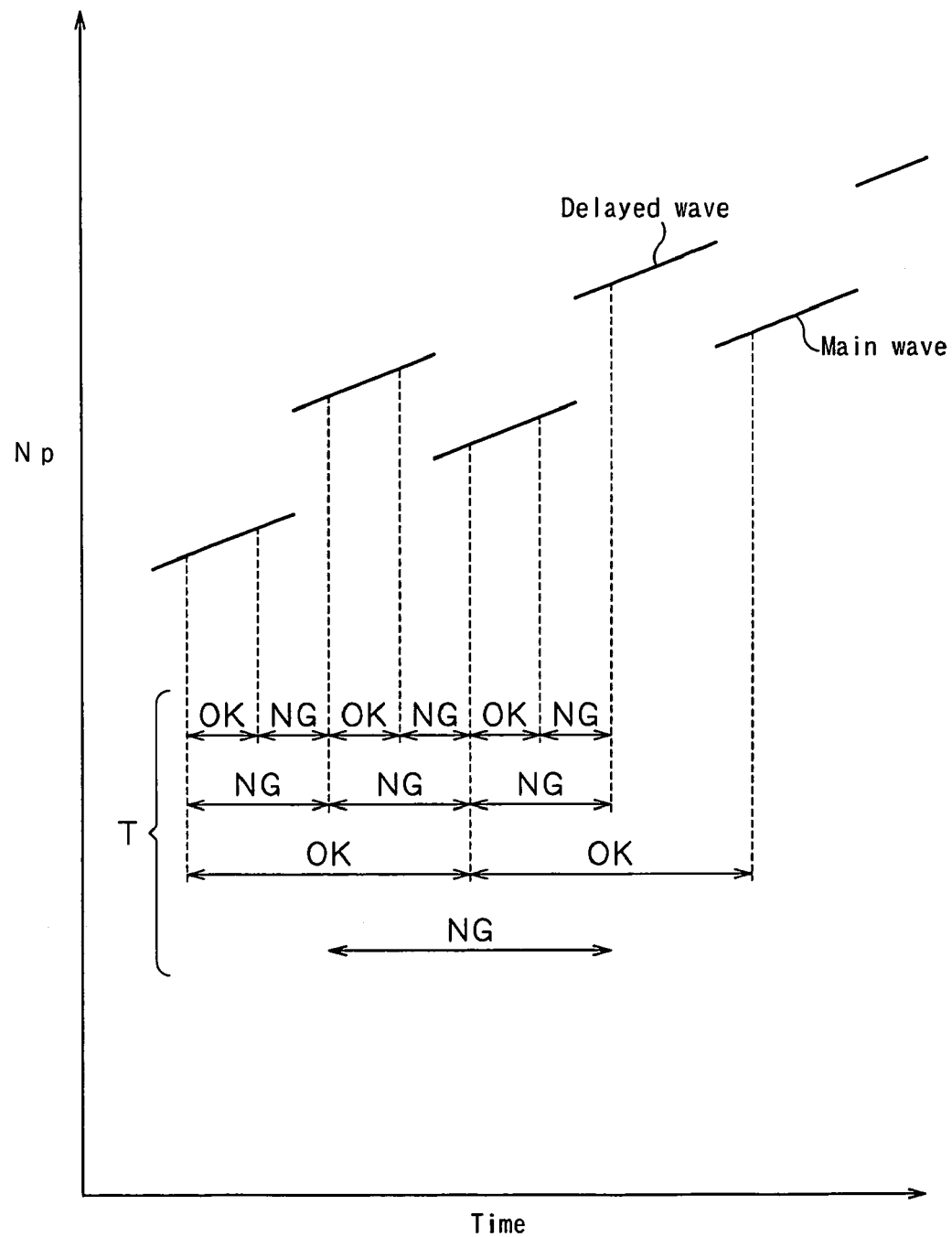
FIG. 13 shows when a gradient can be detected accurately, and when the gradient cannot be detected accurately, in a frequency-selective fading environment.

Note here that in a receiving environment such as a frequency-selective fading, the gradient S of a peak timing Np can be detected (as in a period indicated with "OK" in FIG. 13) or not (as in period indicated with "NG" in FIG. 13) depending upon the length of the detection period T and detection phase as shown in FIG. 13. Therefore, when it is tried to detect the gradient S of a peak timing Np in a fixed detection period T and detection phase, a quite wrong gradient S will possibly be detected at some fading cycles.

On this account, the Inventor of the present invention provided, the gradient detection circuit 51, a plurality of gradient detection paths different in period T of detecting a gradient S of the peak timing Np from each other to measure a clock-frequency error in a comprehensive manner on the basis of the gradients S detected by the plurality of gradient detection paths, respectively. For example, the results of detection are averaged or plotted into a histogram, for example, on the basis of the plurality of gradients different in detection period T from each other to estimate a clock-frequency error.

Figure 14:
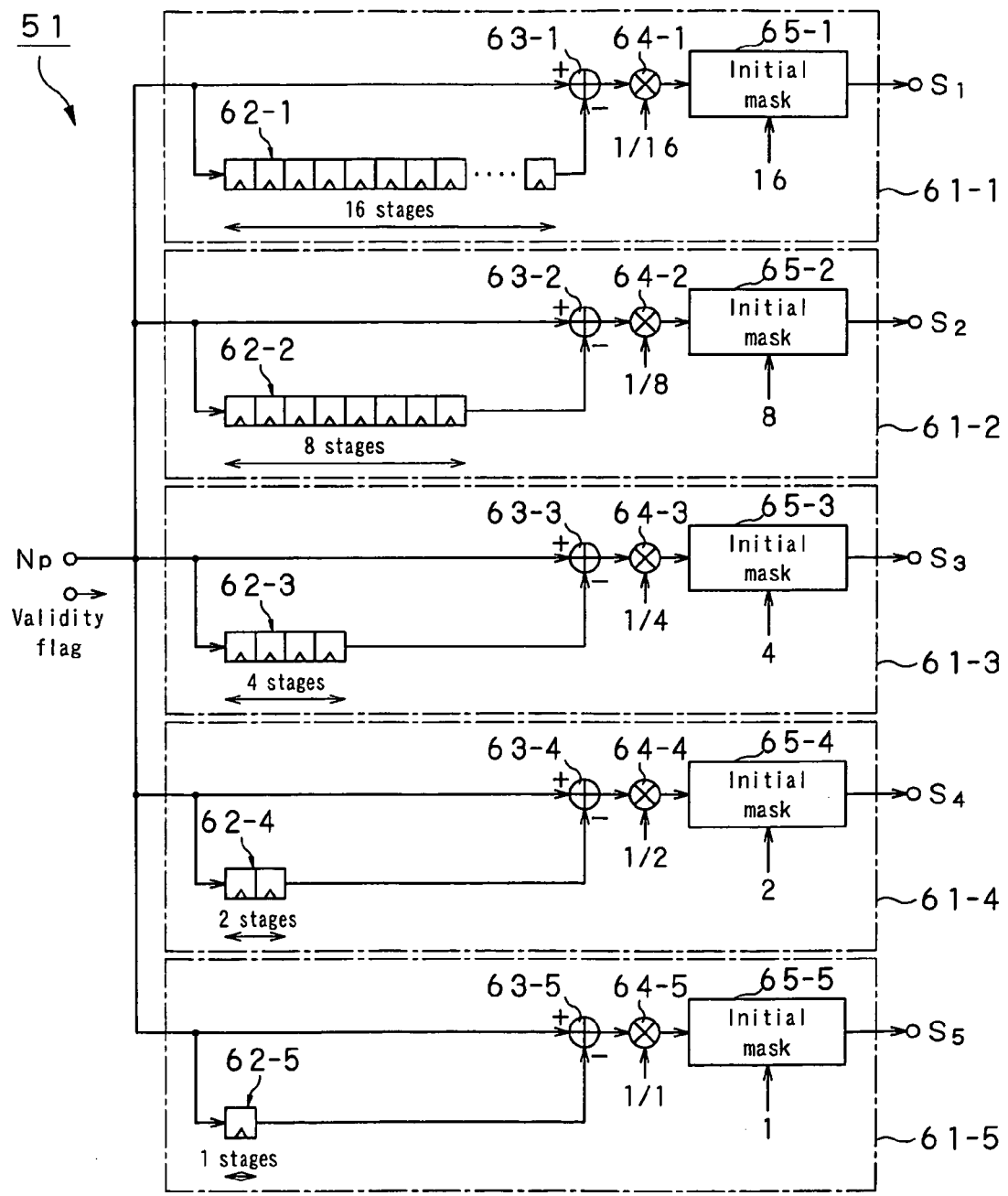
FIG. 14 is a circuit diagram of a gradient detection circuit.

The circuit construction of the gradient detection circuit 51 will be explained in detail below. FIG. 14 is a detail circuit diagram of the gradient detection circuit 51.

As shown in FIG. 14, the gradient detection circuit 51 includes first to fifth gradient detection paths 61-1 to 61-5 to provide gradients S.

The first to fifth gradient detection paths 61-1 to 61-5 are supplied with a peak timing Np synchronously with a valid flag which is made High (1) at every M OFDM symbols. The first to fifth gradient detection paths 61-1 to 61-5 make calculations synchronously with the valid flat (at every M OFDM symbols) to provide gradients $S_1$ to $S_5$.

Different detection periods T are set for the first to fifth gradient detection paths 61-1 to 61-5, respectively. For example, on the assumption that the peak timing Np is supplied as an output at intervals Tx, different detection periods T (T=(n×Tx)) (n is a parameter (natural number) for setting the detection period T and different from one gradient detection path to another) are set for the first to fifth gradient detection paths 61-1 to 61-5, respectively. More specifically, n=16 is set for the first gradient detection path 16-1, n=8 is set for the second gradient detection path 16-2, n=4 is set for the third gradient detection path 16-3, n=2 is set for the fourth gradient detection path 16-4, and n=1 is set for the fifth gradient detection path 16-5.

The first to fifth gradient detection paths 61-1 to 61-5 include delay devices 62-1 to 62-5, subtracters 63-1 to 63-5, multipliers 64-1 to 64-5, and initial mask circuits 65-1 to 65-5, respectively.

Each of the delay devices 62-1 to 62-5 is a shift register composed of n register stages in which data is shifted to a next register synchronously with a valid flag. More particularly, the delay device 62-1 in the first gradient detection path 61-1 is a shift register composed of 16 register stages, delay device 62-2 in the second gradient detection path 61-2 is a shift register composed of 8 register stages, delay device 62-3 in the third gradient detection path 61-3 is a shift register composed of 4 register stages, delay device 62-4 in the fourth gradient detection path 61-4 is a shift register composed of 2 register stages, and the delay device 62-5 in the fifth gradient detection path 61-5 is a shift register composed of one register stages.

The subtracters 63-1 to 63-5 are supplied with a peak timing Np not delayed, and a peak timing Np delayed by the detection time T (T=n×Tx) by the delay devices 62-1 to 62-5, respectively. The subtracters 63-1 to 63-5 subtract the delayed peak timing Np from the peak timing Np not delayed. Therefore, the subtracters 63-1 to 63-5 provide a change of the peak timing Np, detected in the detection period T.

The multipliers 64-1 to 64-5 multiply the change of peak timing Np from the subtracters 63-1 to 63-5 by a reciprocal of the parameter n to provide gradients $S_1$ to $S_5$ indicating the gradients of the peak timing Np. The multipliers 64-1 to 64-5 supply the gradients $S_1$ to $S_5$ to outside via the initial mask circuits 65-1 to 65-5.

The initial mask circuits 65-1 to 65-5 stop the outputting of the gradients $S_1$ to $S_5$ for a period since the detection of gradient S is started until valid values are supplied from the multipliers 64-1 to 64-5. That is, the initial mask circuits 65-1 to 65-5 suspend the outputting of the gradients S while the last register stages of the delay devices 62-1 to 62-5 are outputting invalid values. More specifically, the initial mask circuit 64-1 of the first gradient detection path suspends the outputting of the gradient $S_1$ for a period since the detection of the gradient $S_1$ is started until 16 valid flags have been counted, the initial mask circuit 64-2 of the second gradient detection path suspends the outputting of the gradient $S_2$ for a period since the detection of the gradient $S_2$ is started until 8 valid flags have been counted, the initial mask circuit 64-3 of the third gradient detection path suspends outputting of the gradient $S_3$ for a period since the detection of the gradient $S_3$ is started until 4 valid flags have been counted, the initial mask circuit 64-4 of the fourth gradient detection path suspends the outputting of the gradient $S_4$ for a period since the detection of the gradient $S_4$ is started until 2 valid flags have been counted, and the initial mask circuit 64-5 of the fifth gradient detection path suspends the outputting of the gradient $S_5$ for a period since the detection of the gradient $S_5$ is started until one valid flags have been counted.

The gradients $S_1$ to $S_5$ from the initial mask circuits 65-1 to 65-5 are supplied to the histogram generation circuit 52.

(Histogram Generation Circuit)

Figure 15:
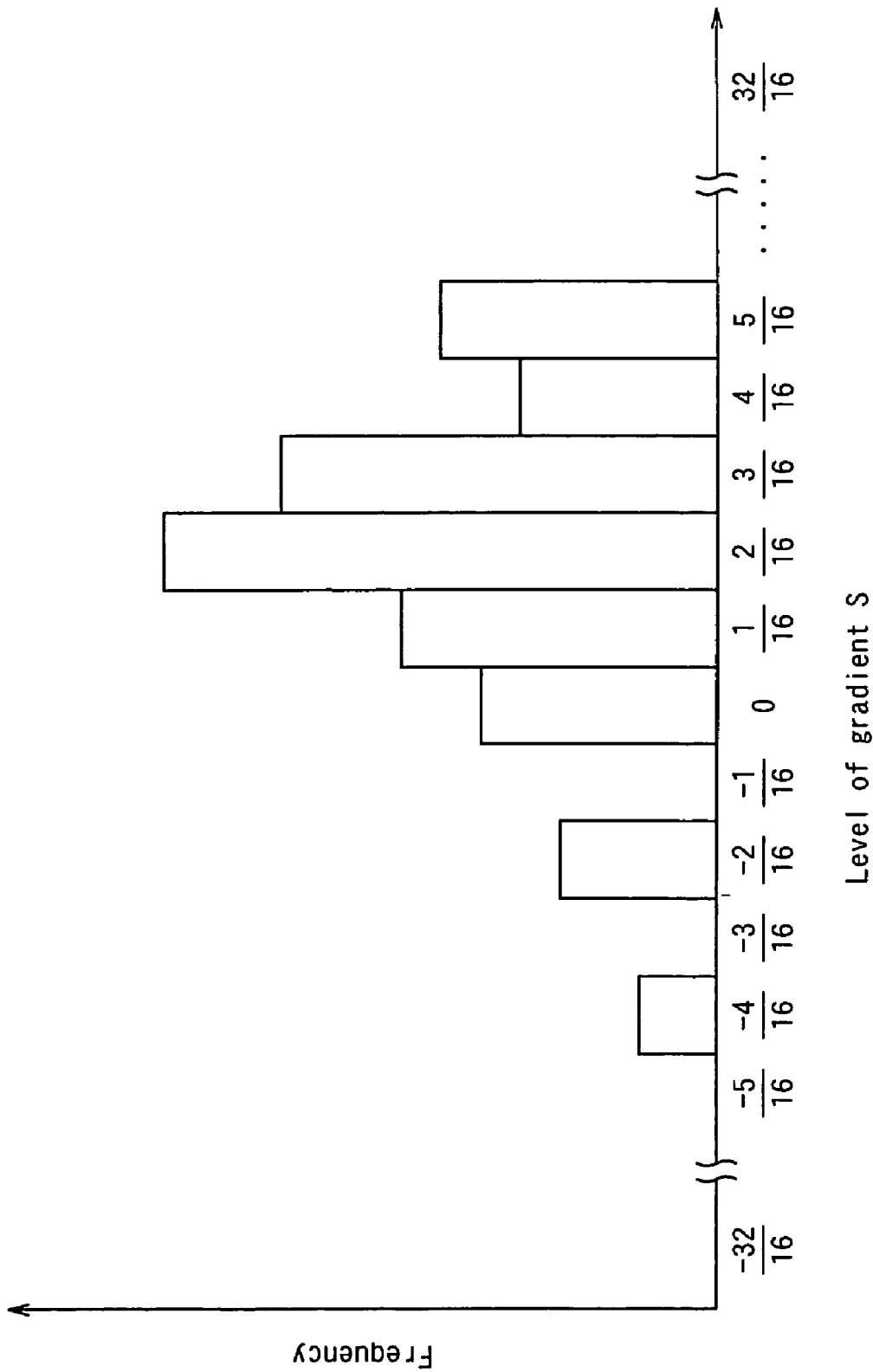
FIG. 15 shows an error detection histogram generated by a histogram generation circuit.

The histogram generation circuit 52 is supplied with a gradient S ($S_1$ to $S_5$) from the gradient detection circuit 51 at each interval Tx at which the peak timing Np is supplied. The histogram generation circuit 52 classifies the input gradient S by the level of the gradient S, and generates a histogram plotting the detection frequency of the gradient S in each class, as shown in FIG. 15. This histogram will be referred to as "error detection histogram" hereunder. The histogram generation circuit 52 cumulates the detection frequency of the gradient S into the error detection histogram, and outputs the most frequent value (value of the most frequent class) of the error detection histogram.

Note that the histogram referred to herein is not any graphic but a data group indicating a distribution of frequencies of the gradient classes. The histograms shown in FIG. 15 and subsequent drawings are graphically illustrated for easier understanding of the data groups.

Figure 16:
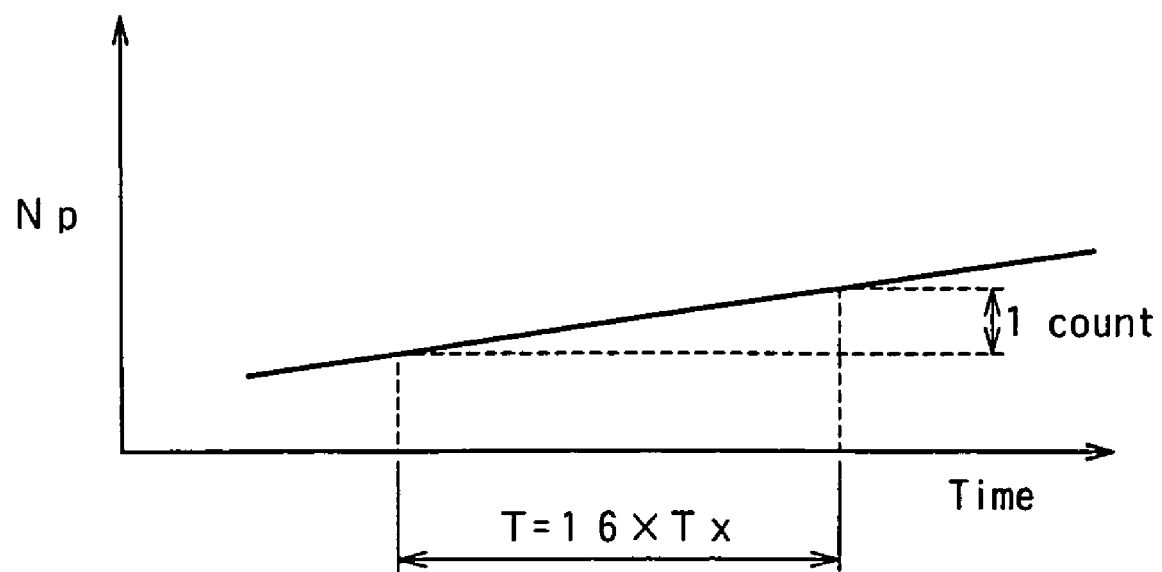
FIG. 16 explains a range of the error detection histogram.

The range of error detection histogram class is set to the finest unit of the gradient S from the gradient detection circuit 51 or to a double the finest unit, for example. According to the present invention, the finest unit of the gradient S of the gradient S is such that the peak timing Np detected in the detection period T (=16×Tx) rises (or falls) one count as shown in FIG. 16. So, the range of the error detection histogram class is set to "1/16", for example.

Figure 17:
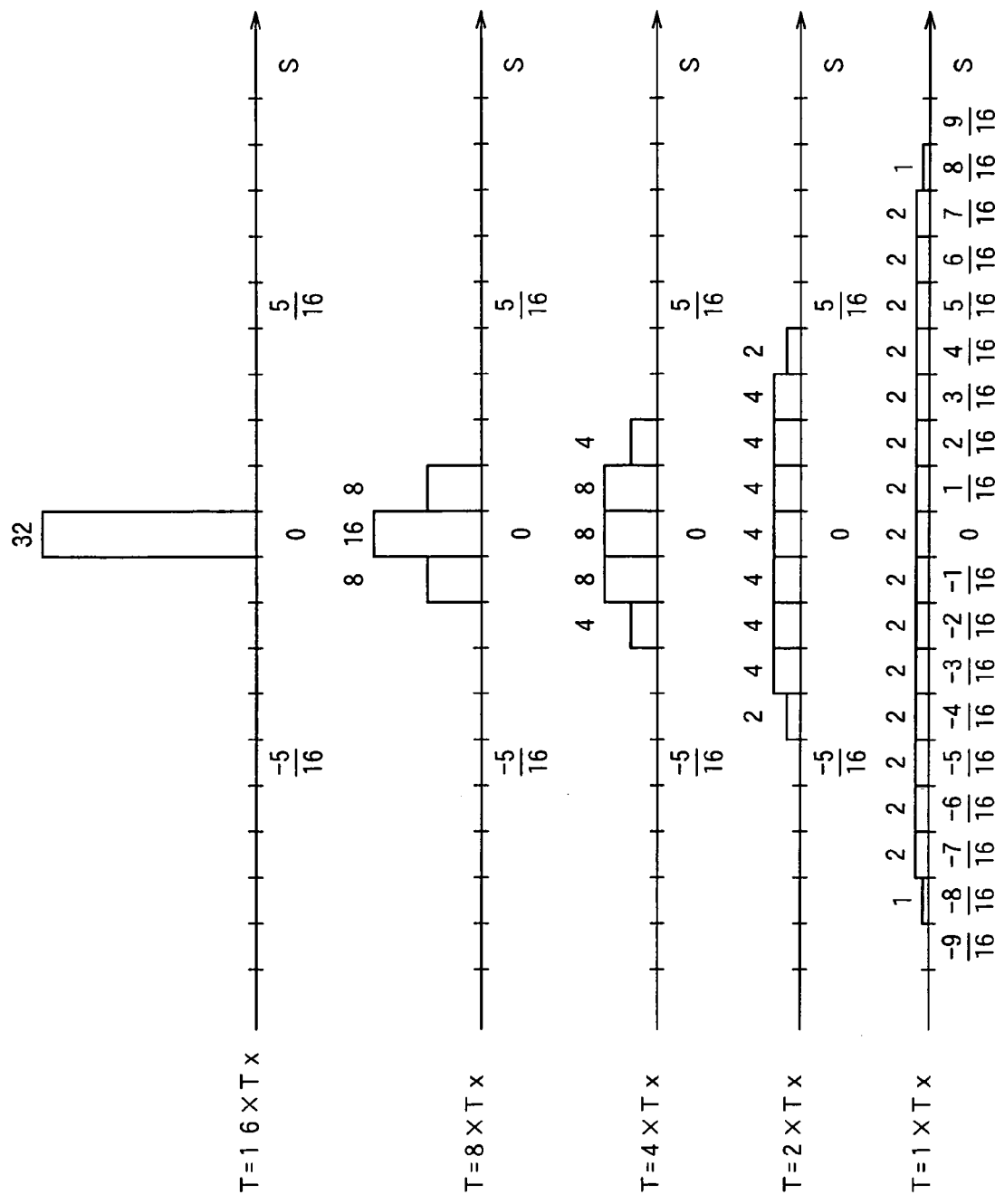
FIG. 17 shows a reference histogram.
Figure 18:
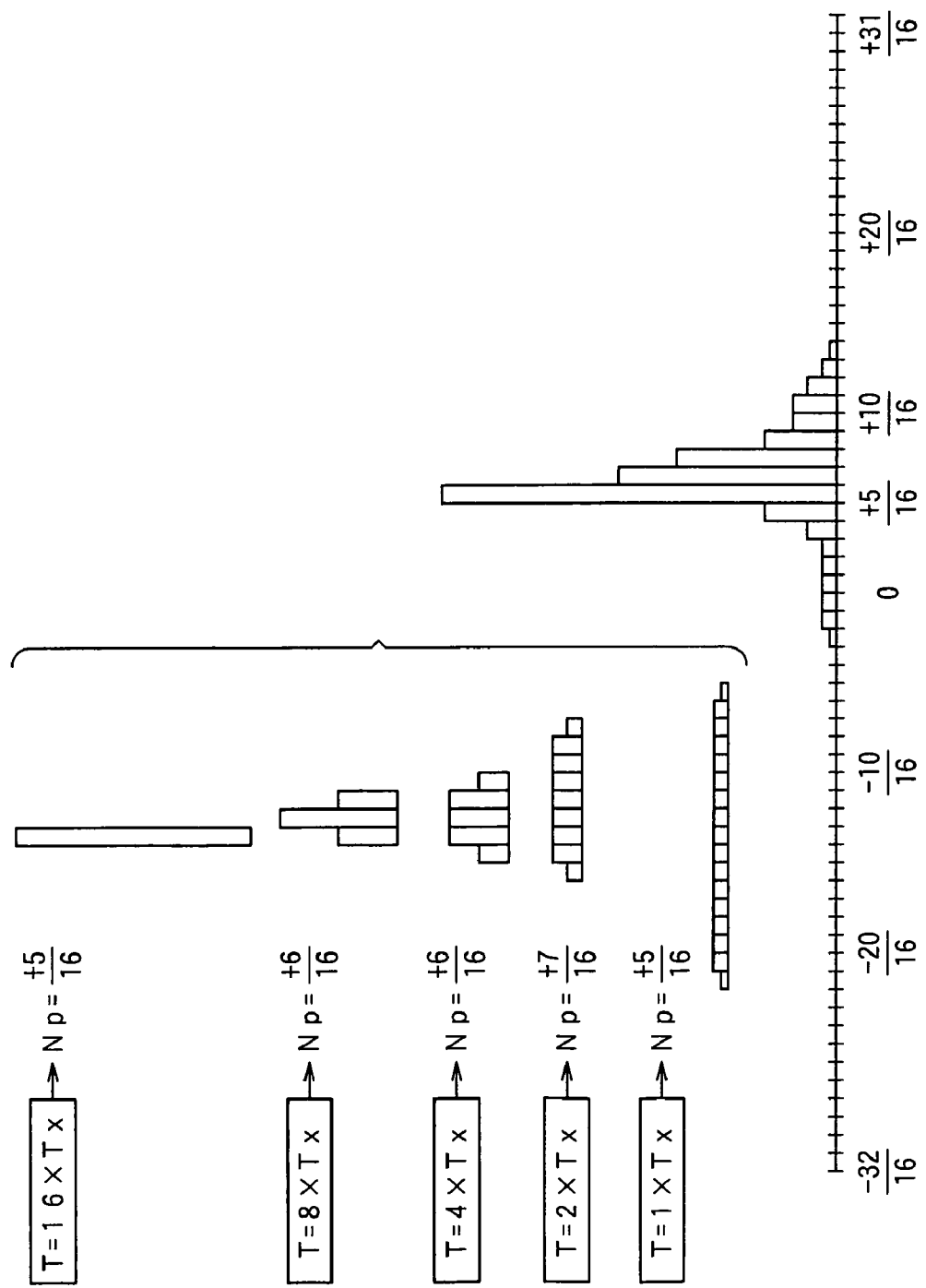
FIG. 18 explains a translation of the reference histogram.

In this embodiment, the histogram generation circuit 52 is supplied with a plurality of gradients S difference in detection period T from each other at each input interval Tx of the peak timing Np on the assumption that the gradient S detected in a longer period T is higher in reliability. On this account, in the histogram generation circuit 52, reference histograms weighted differently from each other are set at each length of the detection period T (that is, at each of the gradient detection paths 61-1 to 61-5) as shown in FIG. 17. When a gradient S detected in a detection period T is supplied, a reference histogram corresponding to the detection period T is selected, it is translated for the class of the gradient S to coincide with the most frequent value as shown in FIG. 18 and the translated reference histogram is added to the error detection histogram.

Each of the reference histograms is weighted as follows, for example:

For each reference histogram, the variable range (width from a value of the lower-end class of the histogram to a value of the upper-end class) is set to be longer correspondingly to the detection period T and different from that of another reference histogram. For example, the variable range of the reference histogram detected in a detection period T (=16×Tx) is set to 1/16, the variable range of the reference histogram detected in a detection period T (=8×Tx) is set to 3/16, the variable range of the reference histogram detected in a detection period T (=4×Tx) is set to 5/16, the variable range of the reference histogram detected in a detection period T (=2×Tx) is set to 7/16, and the variable range of the reference histogram detected in a detection period T (=1×Tx) is set to 15/16, as shown in FIG. 17.

Each reference histogram is set such that the most frequent value is smaller correspondingly to the detection period T and different from that of another reference histogram. For example, the most frequent value of the reference histogram detected in a detection period T (=16×Tx) is set to 32, the most frequent value of the reference histogram detected in a detection period T (=8×Tx) is set to 16. The most frequent value of the reference histogram detected in a detection period T (=4×Tx) is set to 8, the most frequent value of the reference histogram detected in a detection period T (=2×Tx) is set to 4, and the most frequent value of the reference histogram detected in a detection period T (=1×Tx) is set to 2, as shown in FIG. 17.

The reference histograms are equal in sum of frequencies to each other. That is, the reference histograms represented graphically are equal in area to each other. For example, the sum of frequencies is 32, for example, as shown in FIG. 17.

Each reference histogram is set such that the most frequent value coincides with the median and the medial is positioned in the center of the variable range. Also, each reference histogram is set such that the frequency of the upper-end class coincides with that of the lower-end class. Further, each reference histogram is set so that the frequency of a class near the center of the variable range is larger than that of a class near the end rather than the class.

By setting the reference histograms weighted correspondingly to a detection period T as above, it is possible to generate a histogram correspondingly to the reliability of the gradient S.

Figure 19:
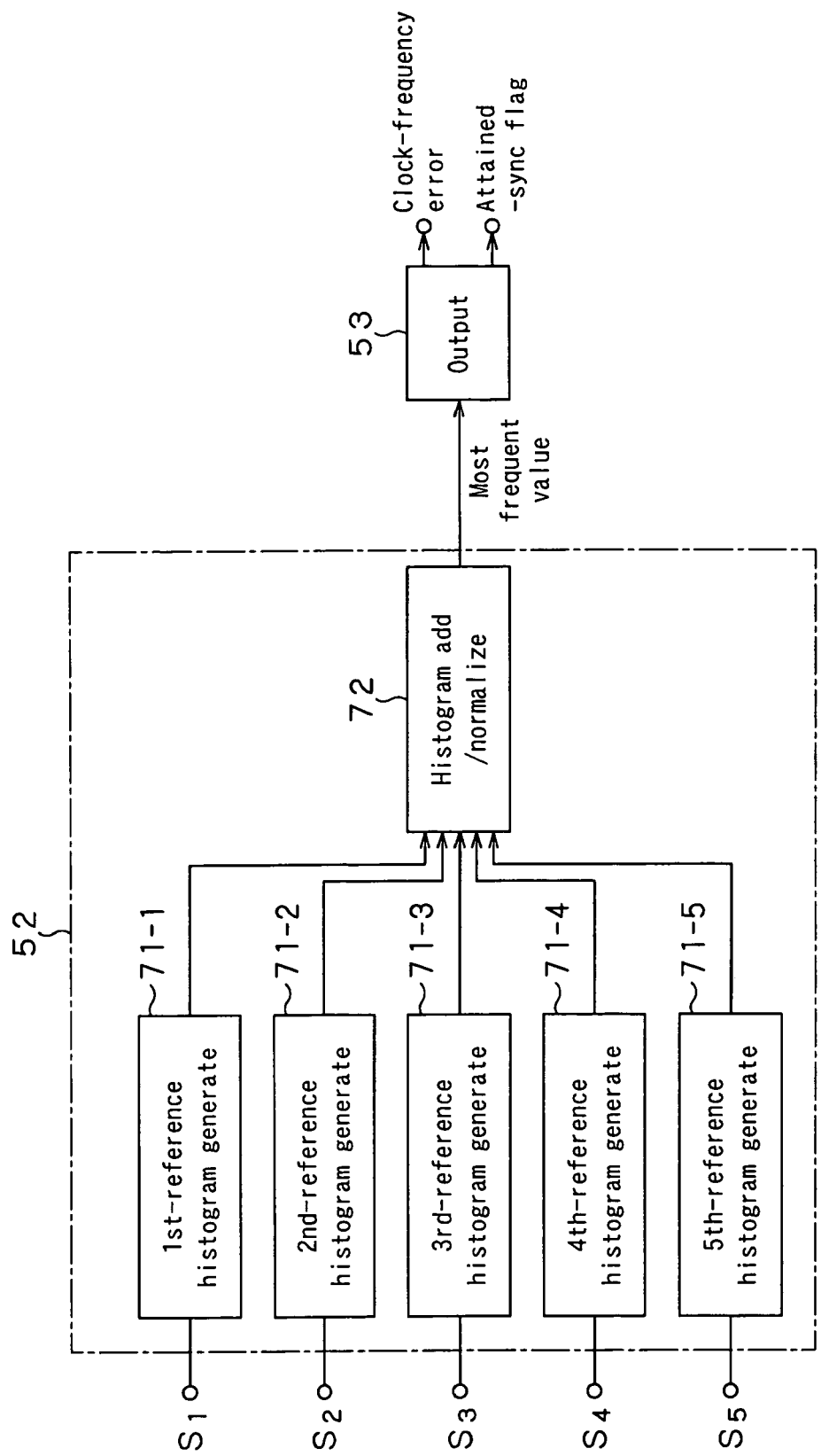
FIG. 19 is a block diagram of the histogram generation circuit.

FIG. 19 is a detail circuit diagram of the histogram generation circuit 52. The histogram generation circuit 52 functions as will be described below.

As shown in FIG. 19, the histogram generation circuit 52 includes first to fifth reference histogram generation circuits 71-1 to 71-5, and a histogram addition/normalization circuit 72.

The first to fifth reference histogram generation circuits 71-1 to 71-5 hold reference histograms weighted differently from each other as shown in FIG. 17. The first to fifth reference histogram generation circuits 71-1 to 71-5 are supplied with gradients $S_1$ to $S_5$ from the corresponding first to fifth gradient detection paths 61-1 to 61-5, respectively, located upstream of the circuits 71-1 to 71-5 at each input interval Tx. More specifically, the first reference histogram generation circuit 71-1 is supplied with a gradient $S_1$ detected in the detection period T (=16×Tx) from the first gradient detection path 61-1, the second reference histogram generation circuit 71-2 is supplied with a gradient $S_2$ detected in the detection period T (=8×Tx) from the second gradient detection path 61-2, the third reference histogram generation circuit 71-3 is supplied with a gradient $S_3$ detected in the detection period T (=4×Tx) from the third gradient detection path 61-3, the fourth reference histogram generation circuit 7-14 is supplied with a gradient $S_4$ detected in the detection period T (=2×Tx) from the fourth gradient detection path 61-4, and the fifth reference histogram generation circuit 71-5 is supplied with a gradient $S_5$ detected in the detection period T (=1×Tx) from the fifth gradient detection path 61-5.

The first to fifth reference histogram generation circuits 71-1 to 71-5 classify the input gradients S and translate the reference histograms held internally so that the most frequent values will fall within the respective classes. Then, the first to fifth reference histogram generation circuits 71-1 to 71-5 supply the translated reference histograms to the histogram addition/normalization circuit 72. It should be noted that the first to fifth reference histogram generation circuits 71-1 to 71-5 provide the reference histograms at each input terminal Tx.

The histogram addition/normalization circuit 72 stores an error detection histogram therein. The histogram addition/normalization circuit 72 adds all the input reference histograms to the error detection histogram. That is, the histogram addition/normalization circuit 72 generates an error detection histogram by adding together all the five reference histograms and cumulatively adding the reference histograms supplied at each input interval Tx. The histogram addition/normalization circuit 72 calculates a most frequent value in the error detection histogram, and supplies it to the downstream output circuit 53 at each input interval Tx, for example.

Also, the histogram addition/normalization circuit 72 normalizes the error detection histogram when the frequency of the most frequent value of the internally stored error detection histogram exceeds a constant threshold. That is, when the frequency of the most frequent value exceeds the constant threshold, the histogram addition/normalization circuit 72 normalizes the error detection histogram. Namely, if the frequency of the most frequent value exceeds the constant threshold, data management cannot be done by a memory. So, the data amount of the entire error detection histogram is reduced. The normalization may be done in an appropriate manner such as division of the data amount by a constant value. In this embodiment, the most frequent value in the error detection histogram is specially important while the class of a lower frequency is less important. On this account, the normalization is done by subtracting a constant value from the frequency of the class of the entire error detection histogram.

Figure 20A:
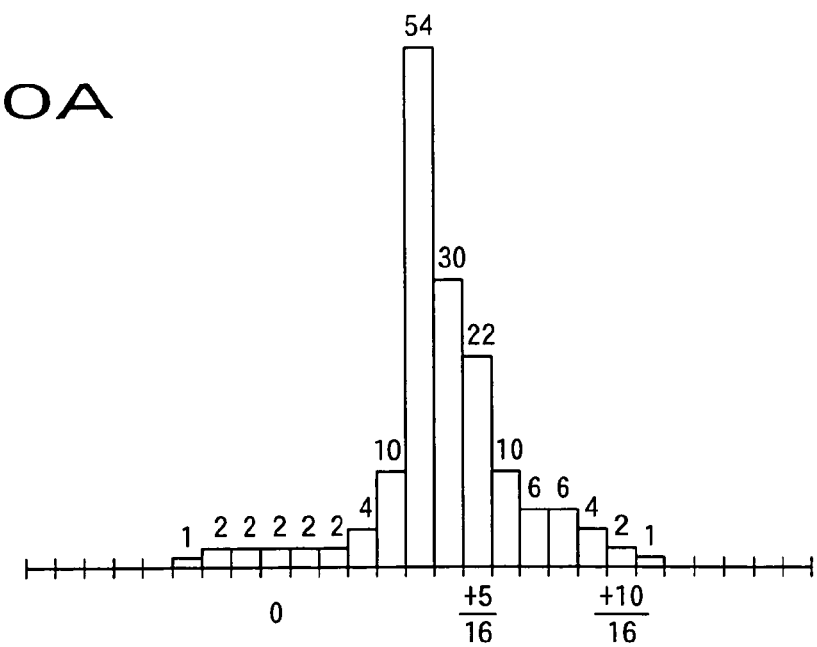
FIG. 20A shows the error detection histogram.
Figure 20B:
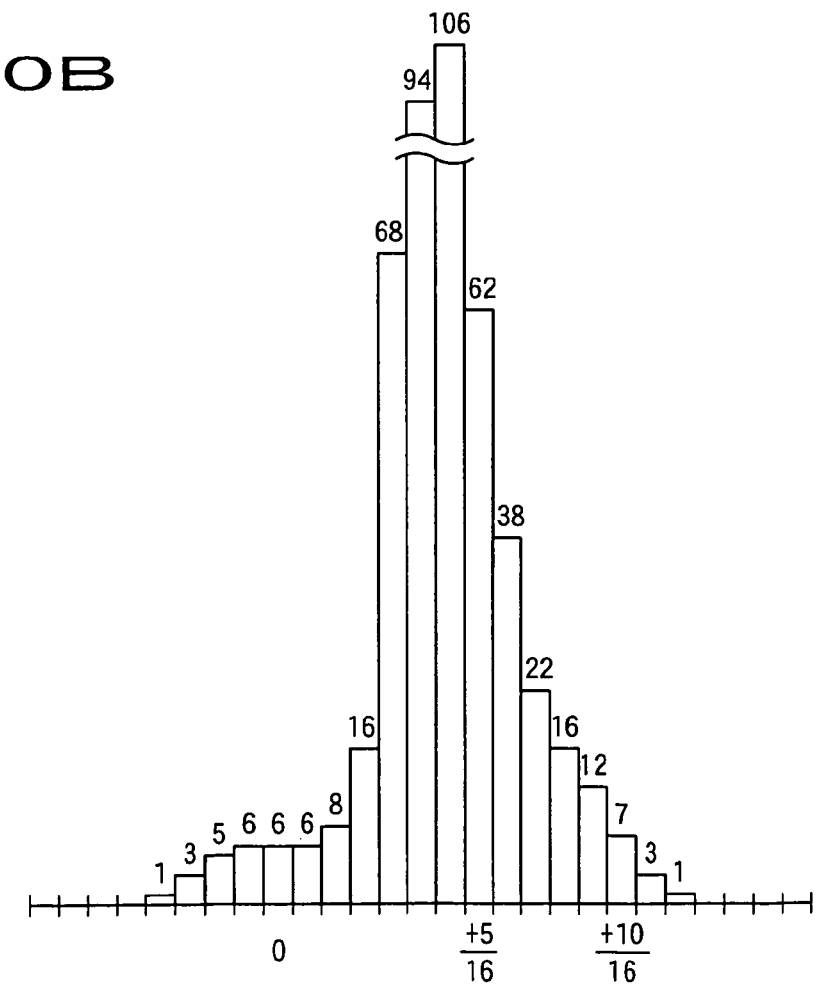
FIG. 20B shows a histogram resulted from parallel averaging of the error detection histogram.

Also, the histogram addition/normalization circuit 72 may be arranged to determine a most frequent value after making moving-averaging of the frequency of the generated error detection histogram in the direction of the class. For example, the histogram addition/normalization circuit 72 re-generates a moving-averaged error detection histogram as shown in FIG. 20B by adding the frequency of each class along with the frequencies of classes adjacent to the class to the error detection histogram as shown in FIG. 20A. Then the histogram addition/normalization circuit 72 calculates a most frequent value on the basis of the moving-averaged error detection histogram. By the moving-averaging of the error detection histogram, it is possible to cancel an error.

Figure 21:
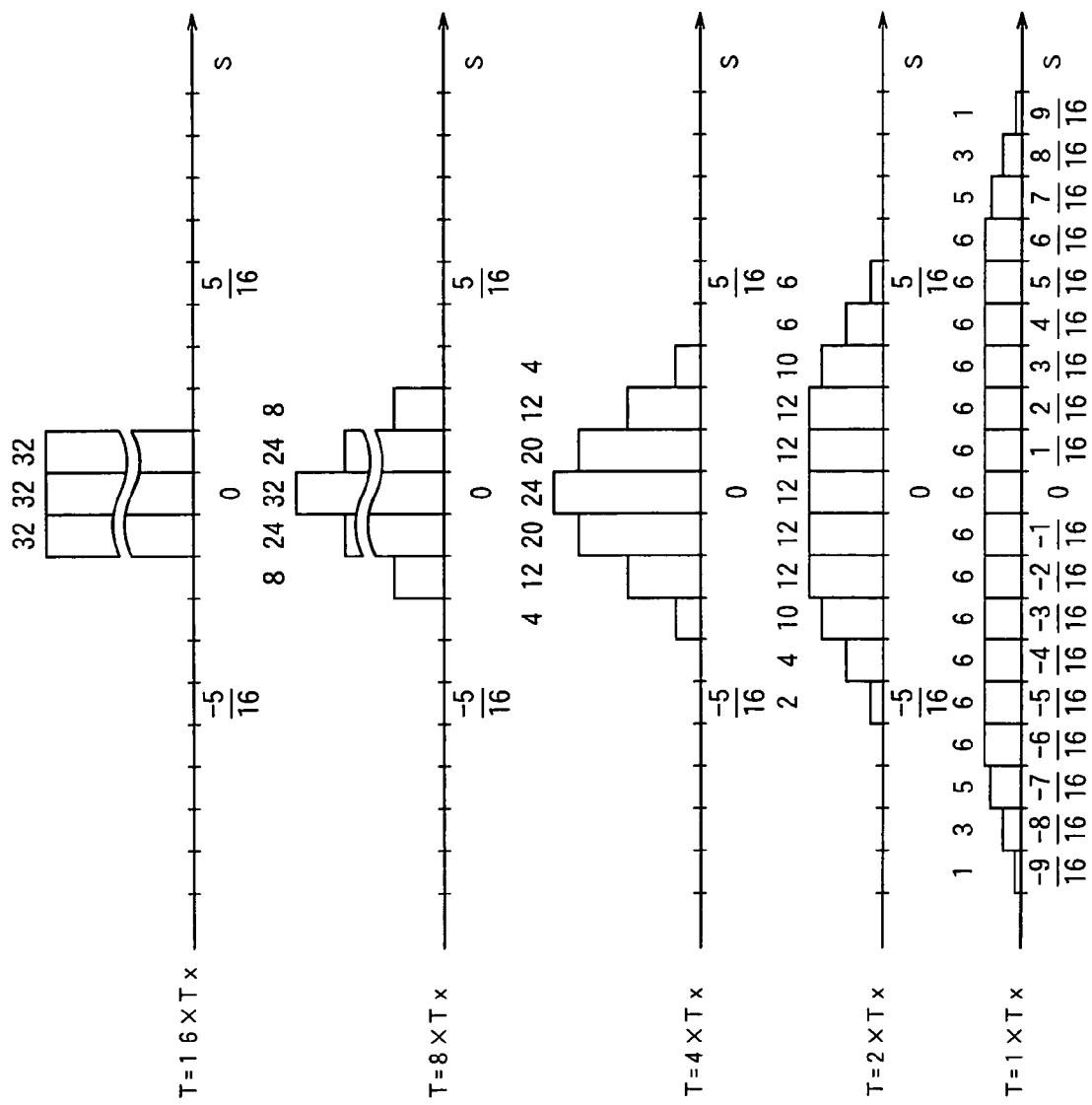
FIG. 21 shows a reference histogram used for moving-averaging of the error detection histogram.

Also, to generate a moving-averaged error detection histogram, each of the reference histogram generation circuits 71-1 to 71-5 may be adapted to hold a reference histogram having been moving-averaged in advance. For example, each reference histogram generation circuit may be arranged to hold a reference histogram (as shown in FIG. 21) resulted from moving-averaging of the reference histogram shown in FIG. 17. By generating a reference histogram having been moving-averaged as above, it is possible to process the reference histogram without having to average it by the histogram addition/normalization circuit 72.

(Output Circuit)

The output circuit 53 judges, based on the supplied most frequent value, whether the histogram generated by the histogram generation circuit 52 is converged or not. When the histogram is determined to be sufficiently converged and stable, the output circuit 53 outputs the input most frequency value as a clock-frequency error. Also, the output circuit 53 generates a attained-synchronization flag which indicates that a synchronization using the clock-frequency error has been attained.

Figure 22:
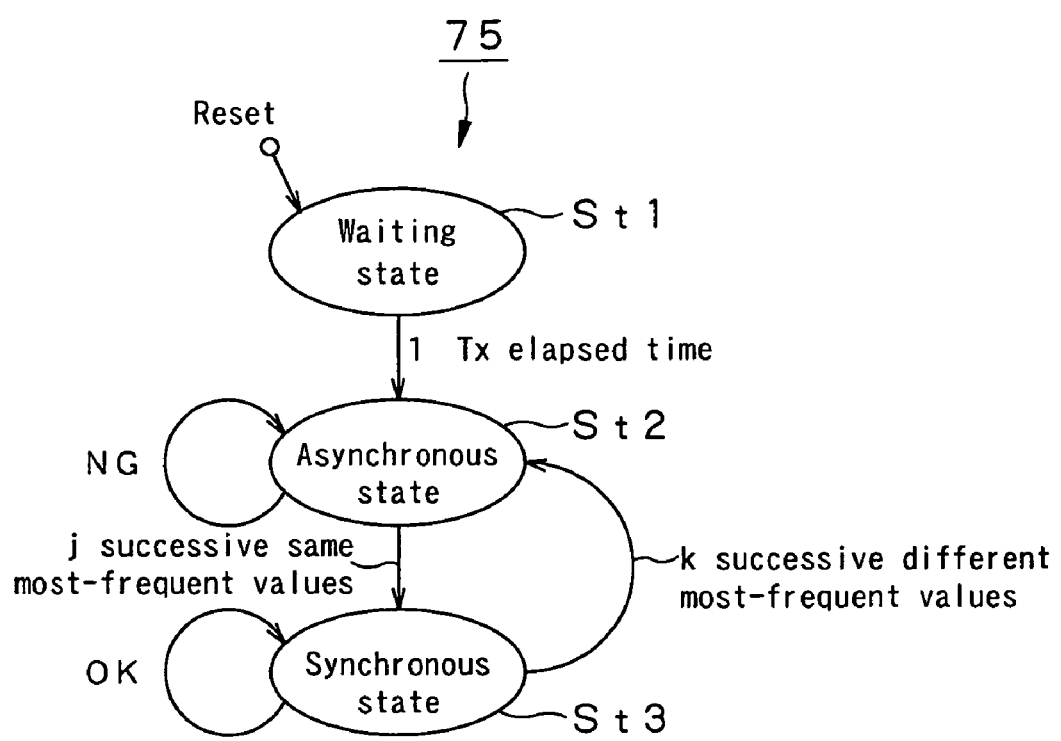
FIG. 22 shows a test machine destined for judgment of convergence of the error detection histogram.

More particularly, the output circuit 53 controls outputting of a clock-frequency error and attained-synchronization flag by a state machine 75 having three states: waiting state St1, asynchronous state St2 and synchronous state St3 as shown in FIG. 22.

The state machine 75 will be described below with reference to FIG. 22.

When reset, the state machine 75 shifts first to the waiting state St1. In the waiting state St1, the state machine 75 will not output any clock-frequency error and attained-synchronization flag. When a time of 1×Tx elapses after the resetting, the state machine 75 shifts from the waiting state St1 to the asynchronous state St2. It should be noted here that the time of 1×Tx means a time interval after the state machine 75 is reset until the gradient detection circuit 51 outputs at least one effective gradient S. That is, after reset, the state machine 75 will stand in the waiting state St1 for a shortest one of the detection periods T in which a plurality of different gradients S is detected. After the shortest period elapses, the state machine 75 is made to shift to the asynchronous state St2.

In the asynchronous and synchronous states St2 and St3, the state machine 75 monitors how the supplied most frequent values vary from one to another to judge whether the histogram is sufficiently converged and stable (namely, synchronization using the clock-frequency error has been attained) or not sufficiently converged and unstable (namely, no synchronization using the clock-frequency error has yet been attained).

If in the asynchronous state St2, the j most frequent values supplied successively at each Tx time are all the same (j is a natural number; 100, for example), the state machine 75 is made to shift from the asynchronous state St2 to the synchronous state St3. Namely, when the same most frequent values are successively supplied from the histogram generation circuit 52, it is determined that the histogram is stable.

Also, if in the synchronous state St3, the k most frequent values supplied successively at each Tx time are different from each other (k is a natural number; 10, for example), the state machine 75 is made to shift from the synchronous state St3 to the asynchronous state St2. Namely, when the histogram generation circuit 52 generates successive different values, it is determined that the histogram is unstable.

In the waiting and asynchronous states St1 and St2, the state machine 75 provides no clock-frequency error and attained-synchronization flag. Only in the synchronous state St3, the state machine 75 will provide a clock-frequency error and attained-synchronization flag.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

The invention claimed is:

1. An OFDM demodulator apparatus for demodulating an orthogonal frequency division multiplex (OFDM) signal whose unit of transmission is a transmission symbol including effective symbols generated by making a time division of an information series and modulating the information into a plurality of sub-carriers and a guard interval generated by copying the signal waveform of a part of the effective symbols, the apparatus comprising:

a clock generating circuit for generating a sampling clock that is asynchronous with respect to the OFDM signal;

an analog-digital converting circuit for sampling the OFDM signal with the sampling clock of a predetermined frequency and converting the sampled OFDM signal into digital data;

a symbol-boundary measuring circuit including a free-running counter that counts the sampling clock so that the count is cyclically repeated at each number of samples in one symbol period, calculating a correlation between the OFDM signal and a signal generated by delaying the OPDM signal by one symbol period, and outputting the count of the free-running counter at a peak timing as a measured value indicative of a boundary between transmission symbols of the OFDM signal with the sampling clock;

a plurality of change-rate calculating circuits each calculating a time-change rate of the measured value; and a clock-frequency error calculating circuit for calculating a clock-frequency error that is a difference between the transmission clock for the OFDM signal and the sampling clock, each change-rate calculating circuit having respective time intervals set for calculation of the time change rate and being different in time interval from each other among the plurality of change-rate calculating circuits; and the clock-frequency error calculating circuit calculating the clock-frequency error based on a plurality of time-change rates from the plurality of change-rate calculating circuits, respectively.

2. The apparatus according to claim 1, wherein the symbol-boundary measuring circuit accumulates the correlation values determined for a plurality of transmission, symbols and detects a peak timing based on the accumulated correlation.

3. The apparatus according to claim 1, wherein each of the plurality of change-rate calculating circuits suspends outputting of the time-change rate for a period after the first measurement is supplied until a set time interval elapses.

4. An OFDM demodulator apparatus for demodulating an orthogonal frequency division multiplex (OFDM) signal whose unit of transmission is a transmission symbol including effective symbols generated by making a time division of an information series and modulating the information into a plurality of sub-carriers and a guard interval generated by copying the signal waveform of a part of the effective symbols, the apparatus comprising:

an analog-digital converting circuit for sampling the OFDM signal with a sampling clock of a predetermined frequency and converting the sampled OFDM signal into digital data;

a symbol-boundary measuring circuit for measuring a value indicative of a boundary between transmission symbols of the OFDM signal with the sampling clock;

a change-rate calculating circuit for calculating a time-change rate of the measured value at every M transmission symbols (M is a natural number)

a histogram generating circuit being supplied with the time-change rate at every M transmission symbols, classifying the time-change rate and generating a histogram of frequencies of detection of time-change rates in each class; and a clock-frequency error calculating circuit for calculating a clock-frequency error that is a difference between the transmission clock for the OFDM signal and the sampling clock on the basis of a most frequent value of the histogram.

5. An OFDM demodulator apparatus for demodulating an orthogonal frequency division multiplex (OFDM) signal whose unit of transmission is a transmission symbol including effective symbols generated by making a time division of an information series and modulating the information into a plurality of sub-carriers and a guard interval generated by copying the signal waveform of a part of the effective symbols, the apparatus comprising:

an analog-digital converting circuit for sampling the OFDM signal with a sampling clock of a predetermined frequency and converting the sampled OFDM signal into digital data;

a symbol-boundary measuring circuit for measuring a value indicative of a boundary between transmission symbols of the OFDM signal with the sampling clock;

a change-rate calculating circuit for calculating a time-change rate of the measured value at every M transmission symbols (M is a natural number)

a histogram generating circuit being supplied with the time-change rate at every M transmission symbols, classifying the time-change rate and generating a histogram of frequencies of detection of time-change rates in each class, the histogram generating circuit cumulatively adding the frequencies of detection of the time-change rate calculated at every M transmission symbols to the histogram; and a clock-frequency error calculating circuit for calculating a clock-frequency error that is a difference between the transmission clock for the OFDM signal and the sampling clock on the basis of the histogram.

6. The apparatus according to claim 5, wherein the histogram generating circuit normalizes the histogram when a frequency of the most frequent value of the histogram exceeds a predetermined threshold.

7. The apparatus according to claim 6, wherein the histogram generating circuit normalizes the histogram by subtracting a constant value from the frequency of each class in the histogram when the frequency of the most frequent value of the histogram exceeds the predetermined threshold.

8. The apparatus according to claim 7, wherein the clock-frequency error calculating circuit calculates a clock-frequency error based on the most frequent value in the histograms.

9. An OFDM demodulator apparatus for demodulating an orthogonal frequency division multiplex (OFDM) signal whose unit of transmission is a transmission symbol including effective symbols generated by making a time division of an information series and modulating the information into a plurality of sub-carriers and a guard interval generated by copying the signal waveform of a part of the effective symbols, the apparatus comprising:
- an analog-digital converting circuit for sampling the OFDM signal with a sampling clock of a predetermined frequency and converting the sampled OFDM signal into digital data;
- a symbol-boundary measuring circuit for measuring a value indicative of a boundary between transmission symbols of the OPDM signal with the sampling clock;
- a change-rate calculating circuit for calculating a time-change rate of the measured value at every M transmission symbols (M is a natural number);
- a histogram generating circuit being supplied with the time-change rate at every M transmission symbols, classifying the time-change rate and generating a histogram of frequencies of detection of time-change rates in each class; and
- a clock-frequency error calculating circuit for averaging the frequencies of classes of the histogram, including the frequencies of a predetermined number of classes about each class, and calculating a clock-frequency error based on the histogram whose class frequencies have been averaged, the clock-frequency being indicative of a difference between the transmission clock for the OFDM signal and the sampling clock.

10. An OFDM demodulator apparatus for demodulating an orthogonal frequency division multiplex (OFDM) signal whose unit of transmission is a transmission symbol including effective symbols generated by making a time division of an information series and modulating the information into a plurality of sub-carriers and a guard interval generated by copying the signal waveform of a part of the effective symbols, the apparatus comprising:
- an analog-digital converting circuit for sampling the OFDM signal with a sampling clock of a predetermined frequency and converting the sampled OFDM signal into digital data;
- a symbol-boundary measuring circuit for measuring a value indicative of a boundary between transmission symbols of the OFDM signal with the sampling clock;
- a change-rate calculating circuit for calculating a time-change rate of the measured value at every M transmission symbols (M is a natural number)
- a histogram generating circuit being supplied with the time-change rate at every M transmission symbols, classifying the time-change rate and generating a histogram of frequencies of detection of time-change rates in each class, wherein for generating a histogram by adding the frequencies of the classes including the calculated time-change rate, the histogram generating circuit adds the frequencies to the classes including the time-change rate and also adds equivalent frequencies to a predetermined number of classes about each class including the time-change rate; and
- a clock-frequency error calculating circuit for calculating a clock-frequency error that is a difference between the transmission clock for the OFDM signal and the sampling clock on the basis of the histogram.

11. An OFDM demodulator apparatus for demodulating an orthogonal frequency division multiplex (OFDM) signal whose unit of transmission is a transmission symbol including effective symbols generated by making a time division of an information series and modulating the information into a plurality of sub-carriers and a guard interval generated by copying the signal waveform of a part of the effective symbols, the apparatus comprising:
- an analog-digital converting circuit for sampling the OFDM signal with a sampling clock of a predetermined frequency and converting the sampled OFDM signal into digital data;
- a symbol-boundary measuring circuit for measuring a value indicative of a boundary between transmission symbols of the OFDM signal with the sampling clock;
- a change-rate calculating circuit for calculating a time-change rate of the measured value at every M transmission symbols (M is a natural number);
- a histogram generating circuit being supplied with the time-change rate at every M transmission symbols, classifying the time-change rate and generating a histogram of frequencies of detection of time-change rates in each class; and
- a clock-frequency error calculating circuit for calculating a clock-frequency error that is a difference between the transmission clock for the OFDM signal and the sampling clock on the basis of the histogram, wherein the clock-frequency error calculating circuit includes a state machine that checks the most frequent value of the histogram at every M transmission symbols to judge, based on a result of the checking, whether the clock-frequency error output is stable or unstable, and wherein the state machine judges whether a preceding most frequent value coincides with a current one, and shifts to the stable state when the preceding most frequent value has been determined to be coincident with the current one a succession of j times (j is a natural number) in case the clock-frequency error output is unstable, while shifting to the unstable state when the preceding most frequent value has been determined to be coincident with the current one a succession of k times (k is a natural number) in case the clock-frequency value output is stable.

12. The apparatus according to claim 11, wherein the clock-frequency error calculating circuit outputs a clock-frequency error and also a flag indicative of whether the clock-frequency error output is stable or unstable.

13. An OFDM demodulator apparatus demodulating an orthogonal frequency division multiplex (OFDM) signal whose unit of transmission is a transmission symbol including effective symbols generated by making a time division of an information series and modulating the information into a plurality of sub-carriers and a guard interval generated by copying the signal waveform of a part of the effective symbols, the apparatus comprising:

an analog-digital converting circuit for sampling the OFDM signal with a sampling clock of a predetermined frequency and converting the sampled OFDM signal into digital data;

a symbol-boundary measuring circuit for measuring a value indicative of a boundary between transmission symbols of the OFDM signal with the sampling clock;

a plurality of change-rate calculating circuits each calculating a time-change rate of the measured value at every M transmission symbols (M is a natural number);

a histogram generating circuit for classifying the time-change rates and generating a histogram of frequencies of detection of time-change rates in each class; and a clock-frequency error calculating circuit for calculating a clock-frequency error that is a difference between the transmission clock for the OFDM signal and the sampling clock based on the histogram, the time-change rate calculating time intervals being set in units of a multiple of the number of M symbols in the change-rate calculating circuit and being different from each other; and the histogram generating circuit being supplied with the time-change rates from the plurality of change-rate calculating circuits at every time interval set for the change-rate calculating circuit, classifying the supplied time-change rates and generating a histogram indicating a detection frequency of the time-change rate in each class.

14. The apparatus according to claim 13, wherein the histogram generating circuit, a reference histogram is set correspondingly to the time interval of each change-rate calculating circuit, and wherein the histogram generating circuit selects, when a time-change rate is supplied from any one of the plurality of change-rate calculating circuits, one of the reference histograms corresponding to that change-rate calculating circuit, translates the selected reference histogram so that the time-change rate provides the most frequency value, and adds the translated reference histogram to the histogram.

15. The apparatus according to claim 14, wherein the reference histogram set correspondingly to each of the plurality of change-rate calculating circuits has a variable range thereof lengthened correspondingly to the time interval of the corresponding change-rate calculating circuit, the ranges being different from each other and the sum of frequencies being the same through the reference histograms.

16. The apparatus according to claim 15, wherein in each of the reference histograms set correspondingly to the respective change-rate calculating circuit, the most frequent value coincides with a median, the frequency of the upper class coincides with that of the lower class, and the frequencies of the upper and lower classes are less than that of the most frequent value.

17. The apparatus according to claim 13, wherein the symbol-boundary measuring circuit calculates a correlation between a signal resulted from delaying the OFDM signal by an effective symbol period and the OFDM signal itself, and calculates a measurement indicative of a boundary of the transmission symbol of the OFDM signal on the basis of a peak timing of the correlation.

18. The apparatus according to claim 17, further comprising a clock generating circuit for generating the sampling clock so as to be asynchronous with the OFDM signal, wherein the symbol-boundary measuring circuit includes a free-running counter that counts the sampling clock so that the count is cyclically repeated at each number of samples in one symbol period, and outputs the count of a free-running counter at the peak timing as the measurement.

19. The apparatus according to claim 17, wherein the symbol-boundary measuring circuit accumulates the correlation values determined for a plurality of transmission symbols and detects the peak timing based on the accumulated correlation.

20. The apparatus according to claim 13, wherein each of the plurality of change-rate calculating circuits suspends outputting of the time-change rate for a period after a first measurement is supplied until a set time interval elapses.

21. The apparatus according to claim 13, wherein the clock-frequency error calculating circuit calculates the clock-frequency error based on a most frequent value of the histogram.

22. The apparatus according to claim 14, wherein the histogram generating circuit cumulatively adds the frequencies of detection of the time-change rate calculated at every M transmission symbols to the histogram.

23. The apparatus according to claim 22, wherein the histogram generating circuit normalizes the histogram when a frequency of the most frequent value of the histogram exceeds a predetermined threshold.

24. The apparatus according to claim 23, wherein the histogram generating circuit normalizes the histogram by subtracting a constant value from the frequency of each class in the histogram when the frequency of the most frequent value of the histogram exceeds the predetermined threshold.

25. The apparatus according to claim 24, wherein the clock-frequency error calculating circuit calculates a clock-frequency error based on most frequent value of the histogram.

26. The apparatus according to claim 14, wherein the clock-frequency error calculating circuit averages the frequencies of classes of the histogram, including the frequencies of a predetermined number of classes about each class, and calculates a clock-frequency error based on the histogram whose class frequencies have thus been averaged.

27. The apparatus according to claim 14, wherein the histogram generating circuits averages the frequencies of the classes of the reference histogram including the frequencies of a predetermined number of classes about each of such classes and then adds the average frequency to the histogram.

28. The apparatus according to claim 13, wherein the clock-frequency error calculating circuit includes a state machine that checks the most frequent value of the histogram at every M transmission symbols to judge, based on a result of the checking, whether the clock-frequency error output is stable or unstable, the state machine judging whether a preceding most frequent value coincides with a current one, and shifting to the stable state when the preceding most frequent value has been determined to be coincident with the current one a succession of j times (j is a natural number) in case the clock-frequency error output is unstable, while shifting to the unstable state when the preceding most frequent value has been determined to be coincident with the current one a succession of k times (k is a natural number) in case the clock-frequency value output is stable.

29. The apparatus according to claim 28 wherein the clock-frequency error calculating circuit outputs a clock-frequency error and also a flag indicative of whether the clock-frequency error output is stable or unstable.

* * * * *